(12) United States Patent
Kobayashi

(10) Patent No.: US 10,954,631 B2
(45) Date of Patent: **\*Mar. 23, 2021**

(54) WEB FORMING DEVICE, WEB PROCESSING DEVICE, FIBROUS FEEDSTOCK RECYCLING DEVICE, AND WEB FORMING METHOD

(71) Applicant: SEIKO EPSON CORPORATION, Tokyo (JP)

(72) Inventor: Nao Kobayashi, Nagano (JP)

(73) Assignee: Seiko Epson Corporation, Tokyo (JP)

( \* ) Notice: Subject to any disclaimer, the term of this patent is extended or adjusted under 35 U.S.C. 154(b) by 33 days.

This patent is subject to a terminal disclaimer.

(21) Appl. No.: 16/503,714

(22) Filed: Jul. 5, 2019

(65) Prior Publication Data

US 2020/0011013 A1 Jan. 9, 2020

(30) Foreign Application Priority Data

Jul. 6, 2018 (JP) .............................. JP2018-128782

(51) Int. Cl.
*D21F 7/06* (2006.01)
*D21F 3/02* (2006.01)
*D21F 2/00* (2006.01)
*D21F 1/00* (2006.01)

(52) U.S. Cl.
CPC .............. *D21F 7/06* (2013.01); *D21F 1/0027* (2013.01); *D21F 2/00* (2013.01); *D21F 3/02* (2013.01)

(58) Field of Classification Search
USPC ................................................. 162/198, 263
See application file for complete search history.

(56) References Cited

U.S. PATENT DOCUMENTS

| 5,496,407 A | \* | 3/1996 | McAleavey | ............ | B05C 11/02 |
| | | | | | 118/677 |
| 6,179,964 B1 | \* | 1/2001 | Begemann | ........... | D21G 9/0009 |
| | | | | | 162/198 |
| 2003/0117492 A1 | \* | 6/2003 | Jokela | .................... | B65H 26/02 |
| | | | | | 348/88 |

(Continued)

FOREIGN PATENT DOCUMENTS

| JP | 07-003603 A | 1/1995 |
| JP | 2012-504752 A | 2/2012 |

*Primary Examiner* — Mark Halpern
(74) *Attorney, Agent, or Firm* — Global IP Counselors, LLP

(57) ABSTRACT

Provided is technology enabling appropriately maintaining or adjusting the thickness of accumulated fiber when accumulating and processing fiber. A sheet manufacturing apparatus 100 has a distributor 60 that distributes a mixture MX containing fiber; a second web former 70 that forms a second web W2; a mesh belt 72 that conveys the second web W2 in a conveyance direction F1; a roller unit 650 that compresses the second web W2; a measurement device 400 that measures the distribution of the thickness of the second web W2 in a second direction intersecting the conveyance direction F1 while the second web W2 is being compressed by the roller unit 650, or after the second web W2 is compressed by the roller unit 650; and a controller 110 that compares a measurement from the measurement device 400 with a set thickness distribution, and controls the thickness distribution of the second web W2.

8 Claims, 17 Drawing Sheets

(56) References Cited

U.S. PATENT DOCUMENTS

| | | | |
|---|---|---|---|
| 2010/0073689 A1* | 3/2010 | Schmitt | G01B 11/0691 |
| | | | 356/630 |
| 2011/0222071 A1 | 9/2011 | Grotkopp et al. | |
| 2012/0236139 A1* | 9/2012 | Chang | G01B 11/06 |
| | | | 348/88 |
| 2013/0083332 A1* | 4/2013 | Heath | G01B 11/06 |
| | | | 356/630 |
| 2019/0153672 A1* | 5/2019 | Shitara | G01B 11/0691 |
| 2020/0011010 A1* | 1/2020 | Kobayashi | D21B 1/32 |

* cited by examiner

WEB FORMING DEVICE, WEB PROCESSING DEVICE, FIBROUS FEEDSTOCK RECYCLING DEVICE, AND WEB FORMING METHOD

BACKGROUND

1. Technical Field

The present invention relates to a web forming device, a web processing device, a fibrous feedstock recycling device, and a web forming method.

This application is based upon Japanese Patent Application 2018-128782 filed on Jul. 6, 2018, the entire contents of which are incorporated by reference herein.

2. Related Art

Devices for processing paper fiber are known from the literature. See, for example, JP-A-H7-3603. The device disclosed in JP-A-H7-3603 forms a mat by spraying a mixture of recovered paper fiber and binder onto a screen. The mat is then processed into a molded product of recovered paper fiber by applying pressure and heat.

Methods of measuring the thickness of a formed product by detecting the reflection of light emitted to the object of which the thickness is to be measured are known from the literature. See, for example, JP-T-2012-504752. An advantage of the method disclosed in JP-A-H7-3603 is that thickness can be measured without touching the workpiece being measured.

In a device that accumulates and processes fiber as described in JP-A-H7-3603, the thickness of the accumulated fiber is preferably maintained at a desirable level. However, measuring the thickness of the accumulated fiber is not simple. For example, when using the method described in JP-T-2012-504752, significant variation can occur in the measured thickness because of peaks and valleys (roughness) in the surface of the fiber mat. Therefore, when accumulating and processing fiber, adjusting the thickness of the accumulating fiber is difficult.

SUMMARY

An object of the present invention is to provide technology enabling maintaining or adjusting the thickness of the accumulated fiber to an appropriate thickness when accumulating and processing fiber.

To achieve the foregoing objective, a web forming device according to one aspect of the invention includes a distributor configured to disperse material containing fiber; an accumulator configured to accumulate the material dispersed by the distributor and form a web; a conveyor configured to convey the web in a first direction; a compression device configured to compress the web conveyed in the first direction; a measurement device configured to measure a thickness distribution of the web in a second direction intersecting the first direction while the web is being compressed by the compression device, or after the web is compressed by the compression device; and a controller configured to compare measurements from the measurement device with a previously set thickness distribution, and control the thickness distribution of the web.

In another aspect of the invention, the web forming device also has a plurality of measurement devices disposed along the second direction.

In another aspect of the invention, the web forming device also has a plurality of material suppliers that supply the material to the distributor; and an adjustor configured to adjust an amount of the material supplied to the distributor from the plurality of suppliers as controlled by the controller.

In a web forming device according to another aspect of the invention, the distributor has a distribution drum that disperses the material, and a case surrounding a space between the distribution drum and the accumulator, and disperses the material in air inside the case, and an air flow adjustor configured to adjust an air flow in the second direction inside the case as controlled by the controller.

Another aspect of the invention is a web processing device including: a distributor configured to disperse material containing fiber; an accumulator configured to accumulate the material dispersed by the distributor and form a web; a conveyor configured to convey the web in a first direction; a first compression device configured to compress the web conveyed in the first direction; a measurement device configured to measure a thickness distribution of the web in a second direction intersecting the first direction while the web is being compressed by the first compression device, or after the web is compressed by the first compression device; a controller configured to compare measurements from the measurement device with a previously set thickness distribution, and control the thickness distribution of the web; and a second compression device configured to compress the web after measurement by the measurement device and compression by the first compression device.

In a web processing device according to another aspect of the invention, the first compression device compresses the web with less pressure than the second compression device.

To achieve the foregoing objective, another aspect of the invention is a fibrous feedstock recycling device including: a defibrator configured to defibrate feedstock containing fiber; a distributor configured to distribute defibrated material defibrated by the defibrator; an accumulator configured to accumulate the defibrated material distributed by the distributor, and form a web; a conveyor configured to convey the web in a first direction; a first compression device configured to compress the web conveyed in the first direction; a measurement device configured to measure a thickness distribution of the web in a second direction intersecting the first direction while the web is being compressed by the first compression device, or after the web is compressed by the first compression device; a controller configured to compare measurements from the measurement device with a previously set thickness distribution, and control the thickness distribution of the web; and a second compression device configured to compress the web after measurement by the measurement device and compression by the first compression device.

To achieve the foregoing objective, another aspect of the invention is a web forming method, including: distributing material containing fiber; accumulating the dispersed material and forming a web; conveying the web in a first direction; measuring a thickness distribution of the web in a second direction intersecting the first direction while the web is being compressed, or after the web is compressed; and comparing measurement results with a set thickness distribution, and control the thickness distribution of the web.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the invention are described below with reference to the accompanying figures. Note that the embodiments described below do not limit the content of the embodiment described in the accompanying claims. All configurations described below are also not necessarily essential elements of the invention.

1. Embodiment 1

1. General Configuration of a Sheet Manufacturing Apparatus

Figure 1:
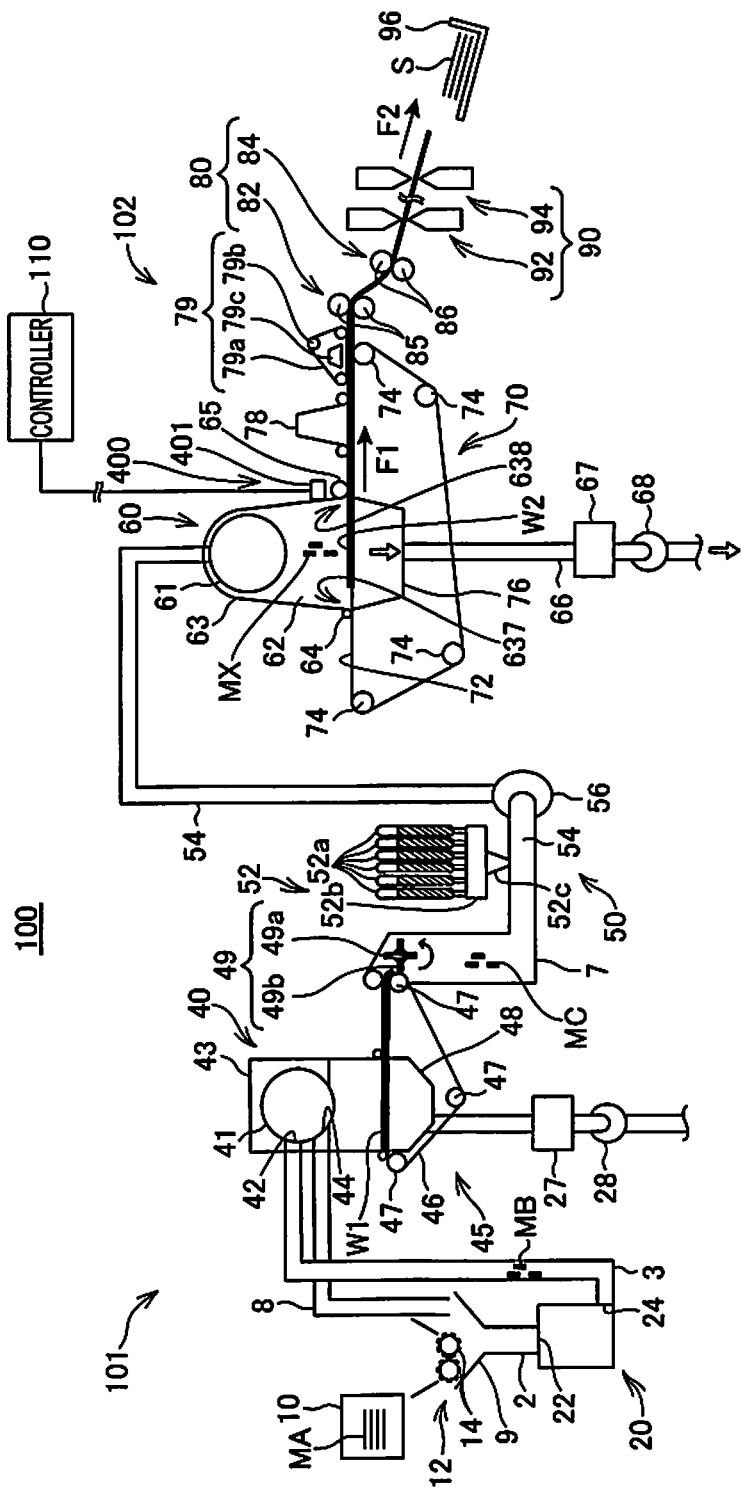
FIG. 1 schematically illustrates the configuration of a sheet manufacturing apparatus according to a first embodiment of the invention.

FIG. 1 schematically illustrates the configuration of a sheet manufacturing apparatus 100 according to the invention.

The sheet manufacturing apparatus 100 corresponds to a measuring device, a web processing device, and a fibrous feedstock recycling device according to the invention, and executes a recycling process of defibrating feedstock material MA containing fiber and making new sheets S from the fiber. The sheet manufacturing apparatus 100 can also mix additives with the feedstock material MA to adjust the binding strength (paper strength) or whiteness, or add color, scents, or functions such as fire retardancy to the sheet S.

The sheet manufacturing apparatus 100 can also adjust the density, thickness, size, and shape of the sheets S. Typical uses of the sheets S include office paper in standard sizes such as A4 or A3, various kinds of sheet products such as cleaning sheets for cleaning flooring, sheets for cleaning up oil and grease, and sheets cleaning toilets, as well as paper plates and other three dimensional forms, and other products such as cushioning materials, sound absorbent materials, and liquid absorbent materials.

The sheet manufacturing apparatus 100 includes a feedstock feeder 10, shredder 12, defibrator 20, classifier 40, first web former 45, rotor 49, mixing device 50, distributor 60, second web former 70, conveyor 79, former 80, and sheet cutter 90. The shredder 12, defibrator 20, classifier 40, and first web former 45 configure a defibration processor 101 that defibrates the feedstock material MA and acquires material used to make the sheets S. The material produced by the defibration process unit 101 is referred to below as material MC.

The rotor 49, mixing device 50, distributor 60, second web former 70, former 80, and sheet cutter 90 configure a sheet maker 102 that processes the material acquired by the defibration processor 101 and makes sheets S.

A configuration adding a rotor 49 and mixing device 50 to the defibration process unit 101 may also be referred to as a feedstock processing device. The feedstock processing device may be any configuration including at least the mixing device 50 that is capable of manufacturing a mixture MX from feedstock material MA containing fiber and the web material MC.

The feedstock feeder 10 in this example is an automatic sheet feeder that holds and continuously supplies the feedstock material MA to the shredder 12. The feedstock material MA may be any material containing fiber, such as recovered paper, waste paper, and pulp sheets.

The shredder 12 has shredder blades 14, shreds the feedstock material MA in air by the shredder blades 14, and produces paper shreds a few centimeters square. The shape and size of the shreds is not specifically limited. A paper shredder, for example, may be used as the shredder 12. The feedstock material MA shredded by the shredder 12 is then collected in a hopper 9, and conveyed through a conduit 2 to the defibrator 20.

The defibrator 20 defibrates the coarse shreds produced by the shredder 12. Defibration is a process of breaking feedstock material MA containing bonded fibers into single fibers or a few intertwined fibers. The feedstock material MA may also be referred to as material to defibrate or defibration material. The material that has been defibrated by the defibrator 20 is referred to as defibrated material MB.

By the defibrator 20 defibrating the feedstock material MA, resin particles, ink, toner, bleeding inhibitors, and other materials included in the feedstock material MA can be expected to also separate from the fibers. In addition to defibrated fibers that have been separated, the defibrated material MB may contain additives that are separated from the fiber during defibration, including resin particles, ink, toner, and other color additives, bleeding inhibitors, and paper strengthening agents.

The defibrator 20 defibrates in a dry process. A dry process as used herein means that the defibration process is done in air or other gas instead of a wet solution. The defibrator 20 uses a defibrator such as an impeller mill in this example. More specifically, the defibrator 20 has a rotor (not shown in the figure), and a liner (not shown in the figure) positioned around the outside of the rotor, and the shreds go between the rotor and the liner and are defibrated.

The shreds are conveyed by an air current from the shredder 12 to the defibrator 20. The defibrated material MB is carried by the air current from the defibrator 20 through a conduit 3 to the classifier 40. The air current conveying the defibrated material may be generated by the defibrator 20 or the air current may be generated by a blower not shown.

The classifier 40 separates the components contained in the defibrated material MB by the size of the fiber. The size of the fiber primarily indicates the length of the fiber. The classifier 40 includes a drum 41, and a housing 43 enclosing the drum 41.

The drum 41 in this example is a sieve such as mesh, a filter or a screen with openings. More specifically, the drum 41 is a cylinder that is rotationally driven by a motor, and has mesh in at least part of its outside surface. The mesh of the drum 41 may be a metal screen, expanded metal made by expanding a metal sheet with slits formed therein, or punched metal, for example.

Defibrated material MB introduced from the inlet 42 to the inside of the drum 41 is separated by rotation of the drum 41 into precipitate that passes through the openings in the drum 41, and remnants that do not pass through the openings.

The precipitate that passes through the openings contains fiber and particles smaller than the openings, and is referred to as first screened material.

The remnants include fibers, undefibrated shreds, and clumps that are larger than the openings, and are referred to as second screened material.

The first screened material precipitates inside the housing 43 and descends to the first web former 45. The second screened material is conveyed through a conduit 8 to the defibrator 20 from an exit opening 44 that communicates with the inside of the drum 41.

Instead of using a sieve-type classifier 40, the sheet manufacturing apparatus 100 may use a cyclone classifier, elbow-jet classifier, or eddy classifier, for example, that selects and separates the first screened material and second screened material.

The first web former 45 includes a mesh belt 46, tension rollers 47, and a suction device 48. The mesh belt 46 is an endless metal belt, and is mounted around multiple tension rollers 47. The mesh belt 46 circulates in a path configured by the tension rollers 47. Part of the path of the mesh belt 46 is flat in the area below the drum 41, and the mesh belt 46 forms a flat surface.

Numerous openings are formed in the mesh belt 46, and components of the first screened material that descends from the drum 41 and are larger than the openings in the mesh belt 46 accumulate on the mesh belt 46. Components of the first screened material that are smaller than the openings in the mesh belt 46 pass through the openings.

Materials that pass through the openings in the mesh belt 46 are referred to as third screened material, and include, for example, resin particles, ink, toner, bleeding inhibitors, and other particles that are separated from the fiber by the defibrator 20.

The suction device 48 pulls air from below the mesh belt 46. The suction device 48 is connected through a conduit 23 to a first dust collector 27. The first dust collector 27 separates the third screened material from the air current. Downstream from the first dust collector 27 is a first collection blower 28, and the first collection blower 28 suctions air from the first dust collector 27 and discharges air through the conduit 29 to the outside of the sheet manufacturing apparatus 100.

The third screened material that passes through the openings in the mesh belt 46 is captured by the first dust collector 27. Because the first screened material descending from the drum 41 is pulled to the mesh belt 46 by the air current suctioned by the suction device 48, the air current has the effect of promoting accumulation of the first screened material.

The material accumulated on the mesh belt 46 is formed into a web, and becomes a first web W1. More specifically, the first web former 45 forms a first web W1 from the first screened material selected by the classifier 40.

Of the components of the first screened material, the first web W1 comprises mainly fibers that are larger than the openings in the mesh belt 46, and is a fluffy web containing much air. The first web W1 is conveyed by movement of the mesh belt 46 to the rotor 49.

The rotor 49 has a base 49a connected to a driver such as a motor not shown in the figure, and fins 49b protruding from the base 49a, and when the base 49a is driven, the fins 49b. The fins 49b in this example are flat blades.

The rotor 49 is disposed at the end of the path of the mesh belt 46, and contacts the first web W1 conveyed by the mesh belt 46 at the place where the first web W1 protrudes from the mesh belt 46. The first web W1 is therefore broken up by the fins 49b striking the first web W1, and reduced to small clumps of fiber, which are then conveyed through the conduit 7 to the mixing device 50.

The material separated from the first web W1 by the rotor 49 is web material MC. The first screened material MC is the first screened material from which the third screened material was removed, and its main component is fiber.

The mixing device 50 mixes the web material MC with an additive. The mixing device 50 has an additive supplier 52 that supplies an additive, and a mixing blower 56. The mixing device 50 may also have a conduit 54 through which the web material MC and additive are conveyed.

One or more additive cartridges 52a storing additives are installed to the additive supplier 52. The additive cartridges 52a may be removably installed to the additive supplier 52. The additive supplier 52 includes an additive extractor 52b that extracts additive from the additive cartridges 52a, and an additive injector 52c that injects the additive extracted by the additive extractor 52b into the conduit 54.

The additive extractor 52b feeds additive in an additive cartridges 52a to the additive applicator 52c by means of a feeder not shown in the figure.

The additive injector 52c has a shutter that opens and closes, and when the shutter is open, the additive extracted by the additive extractor 52b is fed into the conduit 54.

The additive includes resin for binding multiple fibers together. The resin contained in the additive functions as a binder, melts when passing through the sheet former 80, for example, and binds together multiple fibers contained in the web material MC.

The additive supplied may also contain components other than resin for binding fibers. For example, the additive may also include a coloring agent, an anti-blocking agent to prevent agglomeration of fibers or agglomeration of resin, or a flame retardant for making the fiber difficult to burn. The additive may also be in the form of fibers or powder.

The mixing blower 56 produces an air current flowing through a conduit 54 connecting conduit 7 to the distributor 60, and mixes the web material MC with the additive.

The mixing blower 56 in this example is configured with a motor, blades that turn as driven by the motor, and a case housing the blades. In addition to blades for producing an air current, the mixing blower 56 may also include a mixer for mixing the web material MC and the additive.

The mixture mixed by the mixing device 50 is referred to below as mixture MX. The mixture MX is an example of material containing fiber. The mixture MX is conveyed to the distributor 60 and introduced to the distributor 60 by the air current produced by the mixing blower 56.

The distributor 60 detangles the fibers in the mixture MX, and the detangled fibers are dispersed in air while descending to the second web former 70. If the additive supplied from the additive supply device 52 is fibrous, these additive fibers are also detangled by the distributor 60 and descend to the second web former 70.

The distributor 60 includes a dispersing drum 61, and a housing 63 that houses the dispersing drum 61. The dispersing drum 61 is a cylindrical structure configured similarly to the drum 41 described above, for example, rotates as driven by a motor (not shown in the figure) similarly to the drum 41, and functions as a sieve. The dispersing drum 61 has openings, and the mixture MX detangled by rotation of the dispersing drum 61 falls through the openings. As a result, the mixture MX descends from the drum 61 in the internal space 62 formed inside the housing 63. The housing 63 is equivalent to a case in the accompanying claims.

The second web former 70 is located below the dispersing drum 61. The second web former 70 in this example includes a mesh belt 72, tension rollers 74, and a suction mechanism 76.

The mesh belt 72 is an endless metal belt similar to the mesh belt 46 described above, and is mounted around multiple tension rollers 74. The mesh belt 72 circulates in a path configured by the tension rollers 74, and moves in the conveyance direction indicated by the arrow F1. Part of the path of the mesh belt 72 is flat in the area below the dispersing drum 61, and the mesh belt 72 forms a flat surface.

In the flat part of the path of the mesh belt 72, the conveyance direction F1 matches the conveyance direction F2 of the second web W2. Many holes are also formed in the mesh belt 72.

The conveyance direction F1 is an example of the first direction in the accompanying claims. The second web former 70 functions as an accumulator, and the mesh belt 72 is an example of a conveyor in the accompanying claims.

Components of the mixture MX falling from the dispersing drum 61 located above the mesh belt 72 that are larger than the openings in the mesh belt 72 accumulate on the mesh belt 72. Components of the mixture MX that are smaller than the openings in the mesh belt 72 pass through the holes.

The suction mechanism 76 suctions air from the opposite side of the mesh belt 72 as the dispersing drum 61. Material that passes through the openings in the mesh belt 72 is pulled into the suction mechanism 76. The air current suctioned by the suction mechanism 76 pulls the mixture MX falling from the dispersing drum 61 to the mesh belt 72, and effectively promotes accumulation of the mixture.

The air current suctioned by the suction mechanism 76 creates a down flow in the path of the mixture MX descending from the dispersing drum 61, and can be expected to have the effect of preventing precipitating fibers from becoming tangled. The mixture accumulated on the mesh belt 72 is laid in a web, forming a second web W2.

The mesh belt 72 functions as an accumulator and a conveyor, and the surface of the mesh belt 72 is equivalent to a conveyance surface. The second web W2 is an example of a web according to the invention, and accumulated product.

A second collection blower 68 is connected to the suction mechanism 76 through a conduit 66 and a second dust collector 67. The second collection blower 68 suctions air from the suction mechanism 76. The second dust collector 67 is a filter. The air current the second collection blower 68 generates passes through the conduit 66 to the second dust collector 67, and fiber and particles contained in the air current are trapped in the second dust collector 67. The air current passing the second dust collector 67 then passes from the second collection blower 68 through a discharge conduit not shown, and is discharged from the sheet manufacturing apparatus 100.

The distributor 60 also has a first seal roller 64 and a second seal roller 65. An opening 637 through which the mesh belt 72 enters the internal space 62 is formed at the upstream end of the housing 63 in the conveyance direction F1.

Another opening 638 through which the mesh belt 72 and the second web W2 are discharged from the internal space 62 is formed at the downstream end of the housing 63 in the conveyance direction F1. This opening 638 is an example of a discharge opening (exit).

The first seal roller 64 is a roller that contacts the mesh belt 72 at the opening 637. The first seal roller 64 closes the gap formed around the mesh belt 72 at the upstream opening 637.

The second seal roller 65 is a roller that contacts the second web W2 on the mesh belt 72 at the opening 638. The second seal roller 65 closes the gap around the mesh belt 72 and the second web W2 at the downstream opening 638.

The first seal roller 64 and second seal roller 65 do not completely close the openings 637, 638, but effectively suppress the flow of air through the openings 637, 638. More specifically, the first seal roller 64 and second seal roller 65 have the effect of limiting the air current flowing from the openings 637, 638 to the suction mechanism 76. As a result, the air current suctioned by the suction mechanism 76 can more effectively suction the mixture MX inside the internal space 62.

A measurement device 400 for measuring the thickness of the second web W2 is disposed to the distributor 60 on the downstream side in the conveyance direction F1.

The measurement device 400 has an optical detector 401 for measuring the thickness of the second web W2 conveyed to the outside from the distributor 60. The optical detector 401 of the measurement device 400 in this example may be configured with an optical rangefinder that measures distance using light, or a contact sensor that contacts the second web W2.

In this embodiment, the measurement device 400 uses as the optical detector 401 an optical rangefinder that measures distance by emitting a light beam and detecting the reflection. The optical detector 401 may be a laser rangefinder that emits a laser beam and detects the laser beam reflected from the target (second web W2), or an infrared rangefinder that emits an infrared beam and detects the infrared reflection.

The measurement device 400 measures the thickness of the second web W2 by means of the optical detector 401. The optical detector 401 connects to a controller 110 that controls operation of the sheet manufacturing apparatus 100, executes measurements related to the second web W2, and outputs the result to the controller 110. As a result, the controller 110 can measure the thickness of the second web W2 and acquire the detected thickness continuously during the operation of manufacturing a sheet S.

A wetting device 78 is disposed to the conveyance path of the mesh belt 72 downstream from the distributor 60. The wetting device 78 is a mist humidifier that produces and supplies a water mist to the mesh belt 72, and in this example has a tank that holds water, and an ultrasonic vibrator that converts the water to mist. Because the moisture content of the second web W2 can be adjusted by the mist supplied by the wetting device 78, the mist can suppress accretion of fiber on the mesh belt 72 due to static electricity.

The second web W2 is then conveyed by the conveyor 79, separates from the mesh belt 72, and is conveyed to the former 80. The conveyance direction of the second web W2 is conveyance direction F2. The conveyor 79 in this example has a mesh belt 79a, rollers 79b, and a suction mechanism 79c.

The suction mechanism 79c has a blower not shown, and produces an air current flowing upward through the mesh belt 79a by the suction of the blower.

The mesh belt 79a is configured by an endless metal belt with numerous openings in the same way as the mesh belt 46 and mesh belt 72. The mesh belt 79a moves by rotation of the rollers 79b and moves along a circulating path. The second web W2 is separated from the mesh belt 72 and pulled to the mesh belt 79a by the suction force of the suction mechanism 79c in the conveyor 79. The second web W2 moves with the mesh belt 79a and is conveyed to the former 80.

The former 80 has a compression device 82 and a heating device 84. The compression device 82 compresses the second web W2 with a specific nip pressure, adjusts the thickness of the second web W2, and changes the density of the second web W2. By applying heat to the second web W2, the heating device 84 binds the fibers derived from the web material MC contained in the second web W2 through the resin contained in the additive.

The compression device 82 comprises a pair of calender rolls 85. The compression device 82 has a hydraulic press mechanism that applies nip pressure to the calender rolls 85, and a motor that causes the calender rolls 85 to rotate.

The heating device 84 includes a pair of heat rollers 86. The heating device 84 also has a heater (not shown in the figure) that heats the surface of the heat rollers 86 to a specific temperature, and a motor (not shown in the figure) that causes the heat rollers 86 to rotate in the direction of the sheet cutter 90. The second web W2 is heated in the heating device 84 to a temperature greater than the glass transition temperature of the resin contained in the mixture MX, forming a sheet S.

The sheet cutter 90 cuts the sheet S formed by the former 80. In this example, the sheet cutter 90 has a first cutter 92 that cuts the sheet S crosswise to the conveyance direction of the sheet S indicated by the arrow F2 in the figure, and a second cutter 94 that cuts the sheet S parallel to the conveyance direction F2.

The sheet cutter 90 cuts the length and width of the sheet S to a specific size, forming single sheets S. The single sheets S cut by the sheet cutter 90 are then stored in the discharge tray 96. The discharge tray 96 may be a tray or stacker for holding the manufactured sheets, and the sheets S discharged to the tray can be removed and used by the user.

The defibration process unit 101 and sheet maker 102 of the sheet manufacturing apparatus 100 described in this example are configured as an integrated unit, but may be disposed separately. The web material MC and first web W1 produced by the defibration process unit 101 may be removed from the sheet manufacturing apparatus 100 and stored, or it may also be sealed in specific packages in a form ready for shipping or sale. In this case, the sheet maker 102 may be configured to manufacture sheets S by processing the first web W1 or web material MC that is stored or is sealed in packages.

The sheet manufacturing apparatus 100 configured as described above may have, in addition to the wetting device 78, another humidifying device not shown that supplies humidified air. The humidifying device (humidifier) in this example is more specifically configured by a heaterless humidifier that supplies air with a high moisture content by passing air through a filter impregnated with water. For example, a configuration that supplies humidified air from a humidifier to the shredder 12, defibrator 20, classifier 40, mixing device 50, and distributor 60 may be used. By supplying humidified air to each of these components, moisture may be added to the shreds produced by the shredder 12, the defibrated material MB defibrated by the defibrator 20, the web material MC and the mixture MX supplied to the mixing device 50. As a result, electrically charging the shreds, defibrated material MB, web material MC, and mixture MX can be suppressed, and accretion of powder and particles by the effects of static electricity to the inside of the components and the connecting conduits can be suppressed. Therefore, conveyance of the shreds, defibrated material MB, web material MC, and mixture MX through the sheet manufacturing apparatus 100 can be stabilized. Maintenance work to remove powder and particles accreted on parts of the sheet manufacturing apparatus 100 can also be reduced.

1-2. Distributor Configuration

Figure 2:
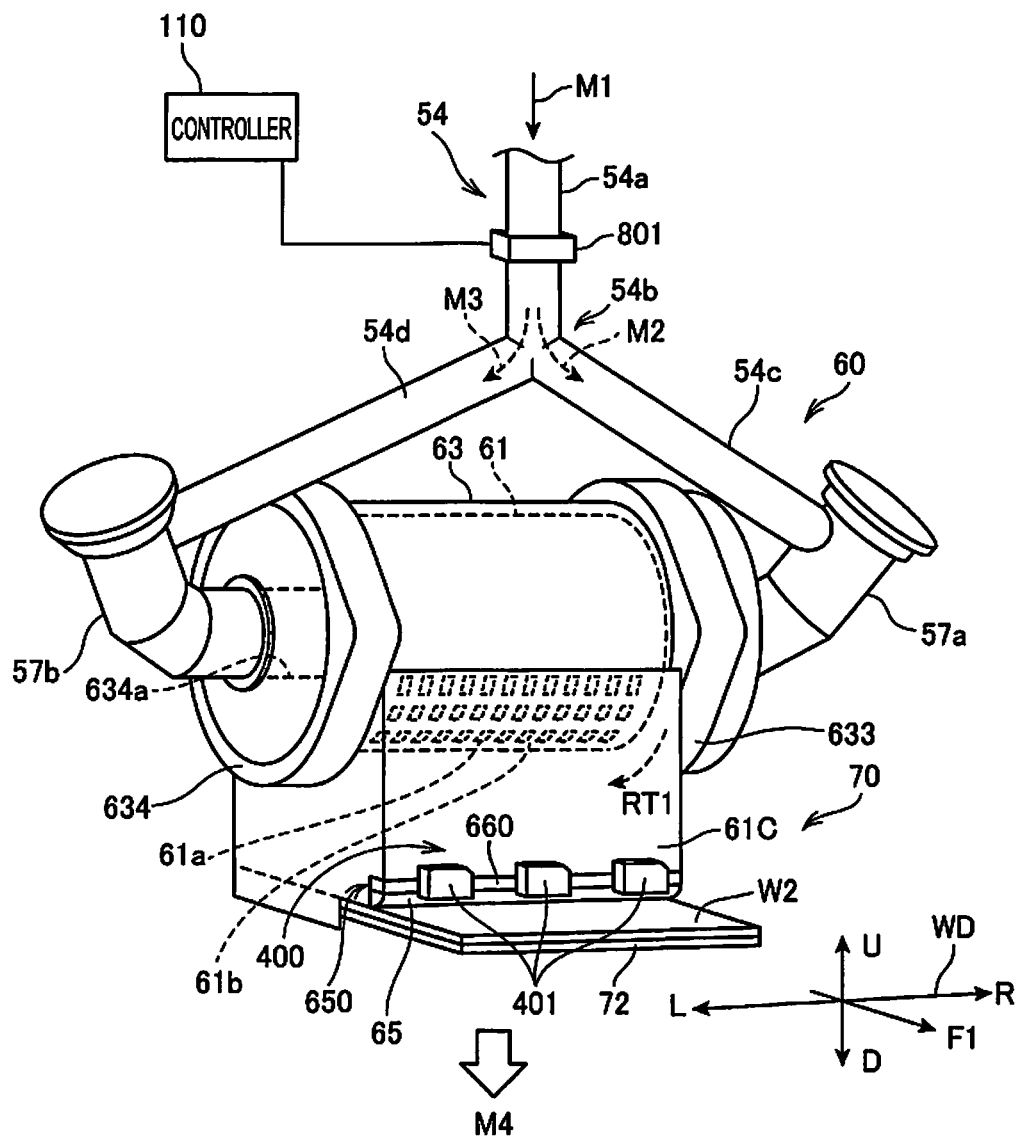
FIG. 2 is an oblique view of the distributor in the first embodiment of the invention.
Figure 3:
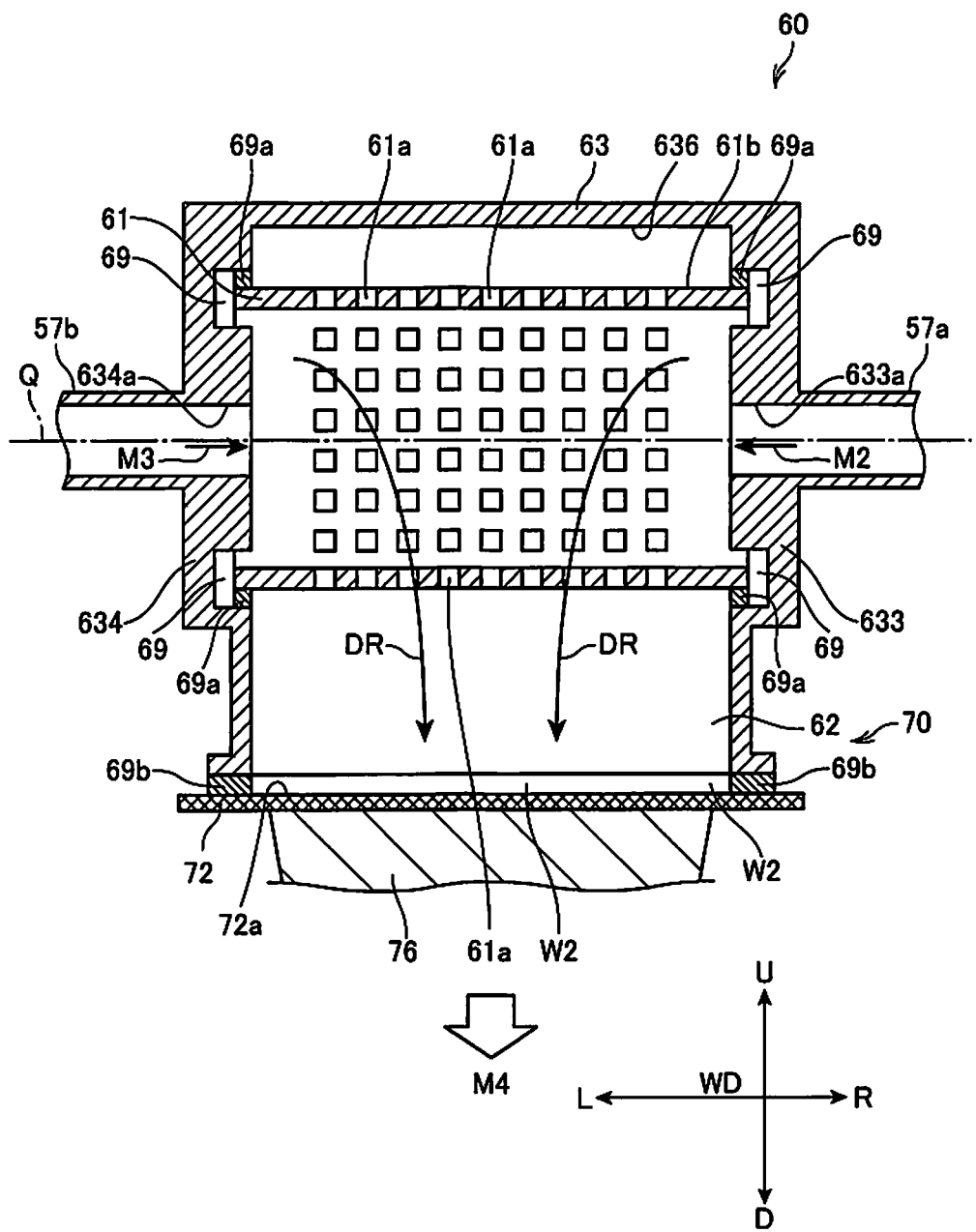
FIG. 3 is a section view of the distributor in the first embodiment of the invention.

FIG. 2 is a perspective view of the distributor 60. FIG. 2 shows the conduit 54 connected to the distributor 60, together with the mesh belt 72 and the controller 110. FIG. 3 is a section view of the distributor 60.

In FIG. 2 and below, the directions to above and below the sheet manufacturing apparatus 100 when in the operating position are referred to as the up direction U and down direction D.

The direction perpendicular to the conveyance direction F1 of the second web W2 formed in the distributor 60 and second web former 70 is the direction to left and right, referred to as respectively as the left L and right R.

The direction across the width of the second web W2 is referred to as the width direction WD. The width direction WD is a direction intersecting the conveyance direction F1, and in this embodiment of the invention is the same as the left-right direction L-R.

The direction U and down direction D are perpendicular to the plane containing the width direction WD and the conveyance direction F1. The width direction WD is also referred to as a second direction.

As shown in FIG. 2 and FIG. 3, the distribution drum 61 is a hollow tube disposed to rotate on an axis of rotation Q. Numerous holes 61a are formed in the outside surface 61b of the distribution drum 61. As the distribution drum 61 turns, fiber passes through the holes 61a, descends, and accumulates on the mesh belt 72, forming a second web W2. The size, shape, and number of holes 61a formed in the distribution drum 61 are not specifically limited. For convenience of illustration, the size of the holes 61a relative to the distribution drum 61 is exaggerated in FIG. 2 and FIG. 3.

The housing 63 has an opposing wall 636 with an inside surface opposite the outside surface 61b, and a right wall 633 and opposing left wall 634. The right wall 633 and left wall 634 are connected to the opposing wall 636, and enclose the distribution drum 61 from opposite sides on the axis of rotation Q. In other words, the housing 63 forms a space between the right wall 633, left wall 634, and opposing wall 636, and houses the distribution drum 61 in this space. A space is also formed between the housing 63 and the outside surface 61b of the distribution drum 61 held inside the housing 63.

As shown in FIG. 3, a recess 69 is formed in the inside surfaces of the right wall 633 and left wall 634. The axial ends of the distribution drum 61 are fit inside the recesses 69, and a pile seal 69a is provided to fill the gaps between the ends of the distribution drum 61 and the recesses 69. The distribution drum 61 is supported rotationally to the housing 63 by the pile seal 69a. The pile seal 69a in this example is a brush with bristles of synthetic resin or natural hair.

A conduit 54 connects to the distributor 60, and air carrying a mixture MX is supplied through the conduit 54. As shown in FIG. 2, the conduit 54 is configured with a single main conduit 54a that connects to the mixing blower 56, and branch conduits 54c and 54d that diverge from a common junction 54b. One branch conduit 54c connects to air line 57a, and 54d connects to air line 57b.

The air current produced by the mixing blower 56 shown in FIG. 1 flows through the main conduit 54a as conveyance current M1 carrying the mixture MX. The conveyance current M1 diverges at the junction 54b into conveyance current M2 flowing through the branch conduit 54c, and conveyance current M3 flowing through branch conduit 54d. Conveyance current M2 and conveyance current M3 are air currents supplying the mixture MX to the distribution drum 61. In this example, branch conduits 54c and 54d function as material suppliers.

Air lines 57a and 57b connect respectively to the right wall 633 and left wall 634 of the housing 63. Air line 57a passes through the right wall 633 and communicates with the inside of the distribution drum 61. More specifically, the housing 63 has a supply port 633a that opens into the space inside the distribution drum 61. Likewise, air line 57b passes through the left wall 634 and communicates with the inside of the distribution drum 61. The housing 63 also has a supply port 634a that opens into the space inside the distribution drum 61.

Supply port 633a is disposed to a position overlapping the axis of rotation Q as seen from the direction of the axis of rotation Q. Supply port 634a is likewise disposed to a position overlapping the axis of rotation Q.

Conveyance current M2 passes from the branch conduit 54c through the air line 57a, and flows into the space inside the distribution drum 61 along the axis of rotation Q. Conveyance current M3 likewise passes from the branch conduit 54d through the air line 57b, and flows into the space inside the distribution drum 61 along the axis of rotation Q.

The mesh belt 72 is disposed below the housing 63. The mesh belt 72 forms the bottom of the housing 63, and continues to the outside of the housing 63 through the opening 63a formed at the bottom of the housing 63. The material that descends from the distribution drum 61 accumulates on the accumulation surface 72a, which is the top surface of the mesh belt 72.

A suction mechanism 76 is disposed below the mesh belt 72, suctions air through the mesh belt 72 by the suction produced by the second collection blower 68, and thereby produces suction current M4 passing through the mesh belt 72.

As conveyance currents M2 and M3 flow into the distribution drum 61 in the space inside the housing 63, the conveyance currents M2 and M3 are suctioned from below by the suction mechanism 76. This produces a downward flow DR in the down direction D from inside the distribution drum 61, and material is carried by the downward flow DR to the accumulation surface 72a.

A pile seal 69b is also disposed between the housing 63 and the mesh belt 72. The pile seal 69b in this example is a brush with bristles of synthetic resin or natural hair, and is disposed between the right wall 633 and mesh belt 72 and between the left wall 634 and mesh belt 72. The pile seal 69b suppresses leakage from the mixture MX from the gaps between the housing 63 and mesh belt 72.

1-3. Configuration of the Air Current Adjustor

Figure 4:
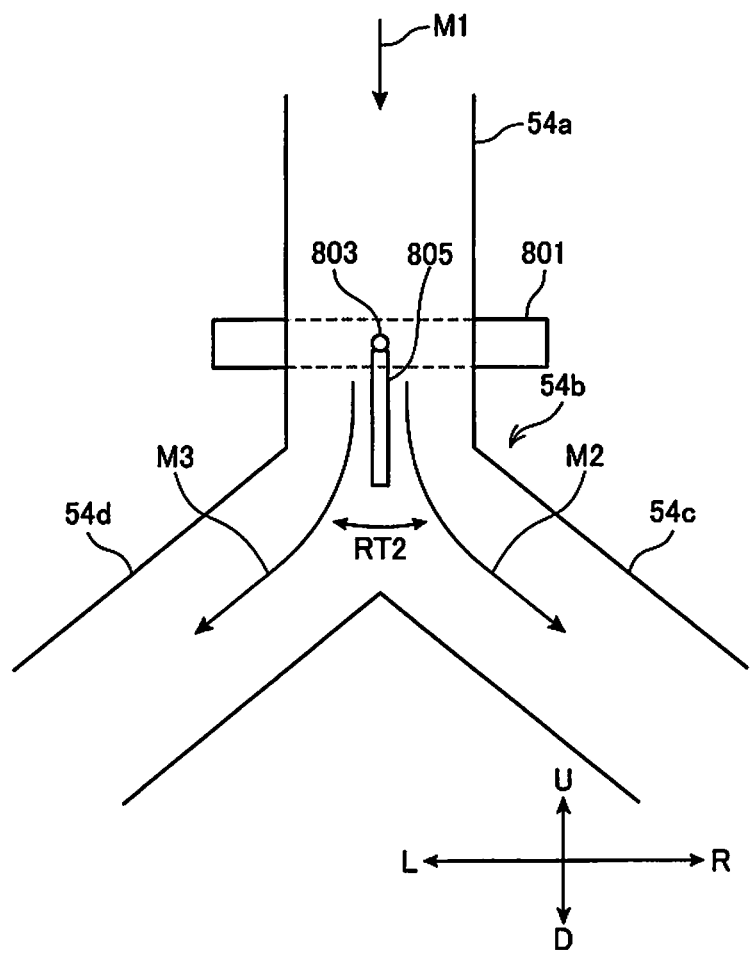
FIG. 4 schematically illustrates the configuration of the air current adjuster in the first embodiment of the invention.

FIG. 4 schematically illustrates the configuration of the air current adjustor 801. The air current adjustor 801 is a device disposed to the main conduit 54a to adjust the ratio of the conveyance current M1 that flows as conveyance current M2 and conveyance current M3.

The air current adjustor 801 includes a rotatably disposed pivot shaft 803, and a flap 805 affixed to the pivot shaft 803. The air current adjustor 801 also has an actuator or motor not shown that causes the pivot shaft 803 to rotate as controlled by the controller 110. The pivot shaft 803 turns in the direction of arrow RT2 in the figure as driven by the actuator or motor not shown, causing the position of the flap 805 to change.

By adjusting the position of the flap 805, the controller 110 can adjust the ratio between the conveyance current M2 and conveyance current M3 at the junction 54b. More specifically, when the position of the flap 805 is biased to the branch conduit 54c side, the flow of conveyance current M2 is greater than conveyance current M3. Likewise, when the position of the flap 805 is biased to the branch conduit 54d side, the flow of conveyance current M3 is greater than conveyance current M2. The controller 110 can therefore control the distribution of the conveyance current M1 to conveyance current M2 and conveyance current M3 by adjusting the position of the air current adjustor 801.

The air current adjustor 801 in this configuration functions as an adjustor that adjusts the amount of mixture MX as the material supplied by the branch conduits 54c and 54d.

1-4. Configuration of the Distribution Drum

The distribution drum 61 shown in FIG. 2 and FIG. 4 is a cylindrical configuration with holes 61a. The distribution drum 61 turns in direction of rotation RT1 by the drive power of a motor not shown as controlled by the controller 110, and causes the mixture MX supplied into the distribution drum 61 to fall through the holes 61a.

The configuration of the distribution drum 61 is not limited to a configuration in which the distribution drum 61 itself turns.

Figure 5:
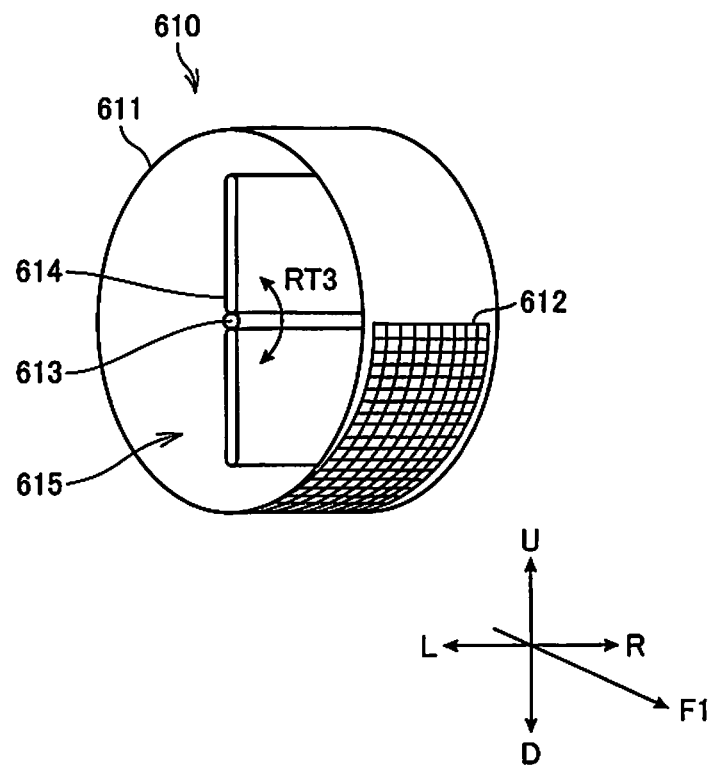
FIG. 5 illustrates the configuration of another example of a distribution drum.

FIG. 5 is a perspective view of a distribution drum 610 with a different configuration than distribution drum 61.

The distribution drum 610 has a drum 611, which is a hollow cylindrical construction. The drum 611 has an internal space, and unlike the distribution drum 61 described above does not rotate. At least part of the circumferential surface of the drum 611 including the side on the down direction D is mesh 612 with screen-like openings. The openings in the mesh 612 are sized to enable resin and other particles contained in the mixture MX to pass through. In this example, the mesh 612 is a metal screen.

A rotational shaft 613 is disposed in the hollow inside 615. The rotational shaft 613 is connected to a motor not shown that operates as controlled by the controller 110, and is supported rotationally to the drum 611. The rotational shaft 613 can turn clockwise and counterclockwise as driven by the motor as indicated by the arrow RT3 in the figure. The rotational shaft 613 may be configured to reverse the direction of rotation. More specifically, the motor that drives the rotational shaft 613 may be configured to change the direction of rotation between a forward direction and a reverse direction as controlled by the controller 110.

A flap 614 is affixed to the rotational shaft 613. The flap 614 is a blade that rotates in conjunction with the rotational shaft 613. The shape and size of the flap 614 are not specifically limited as long as the flap 614 can rotate in the inside 615.

When distribution drum 610 is used in the distributor 60 instead of distribution drum 61, the mixture MX flows from the air lines 57*a* and 57*b* into the inside 615. When the rotational shaft 613 then turns or rotates as controlled by the controller 110, the mixture MX is stirred in the inside 615, and the mixture MX falls in the down direction D through the mesh 612. As a result, the mixture MX descends to and accumulates on the mesh belt 72.

Similarly to the distribution drum 61 described above, the distribution drum 610 temporarily holds the mixture MX supplied from the conduit 54, and then disperses and causes the mixture MX to precipitate to the mesh belt 72. Because the distribution drum 610 also stirs (mixes) the mixture MX by means of the flap 614, the distribution drum 610 also breaks up any clumps of fiber or resin that may be in the mixture MX, thereby forming a second web W2 of good quality. This effect is the same as the effect of the distribution drum 61 described above.

The distributor 60 may be configured using either distribution drum 61 or distribution drum 610. The configuration of the distributor 60 is also not specifically limited, and the distributor 60 may obviously be configured with a distribution drum configured differently from distribution drums 61 and 610, but this embodiment of the invention is described using distribution drum 61 by way of example.

1-5. Configuration of the Roller Unit

As shown in FIG. 2, a roller unit 650 is disposed to the distributor 60. The roller unit 650 has a second seal roller 65 and a construction that supports the second seal roller 65.

Figure 6:
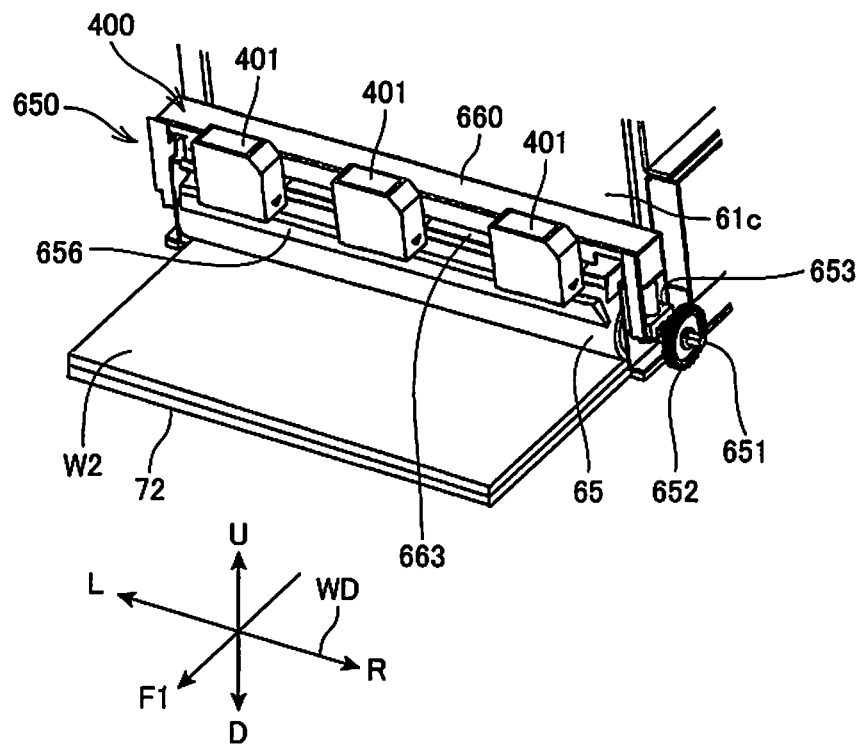
FIG. 6 is a perspective view of main parts of the distributor in the first embodiment of the invention.
Figure 7:
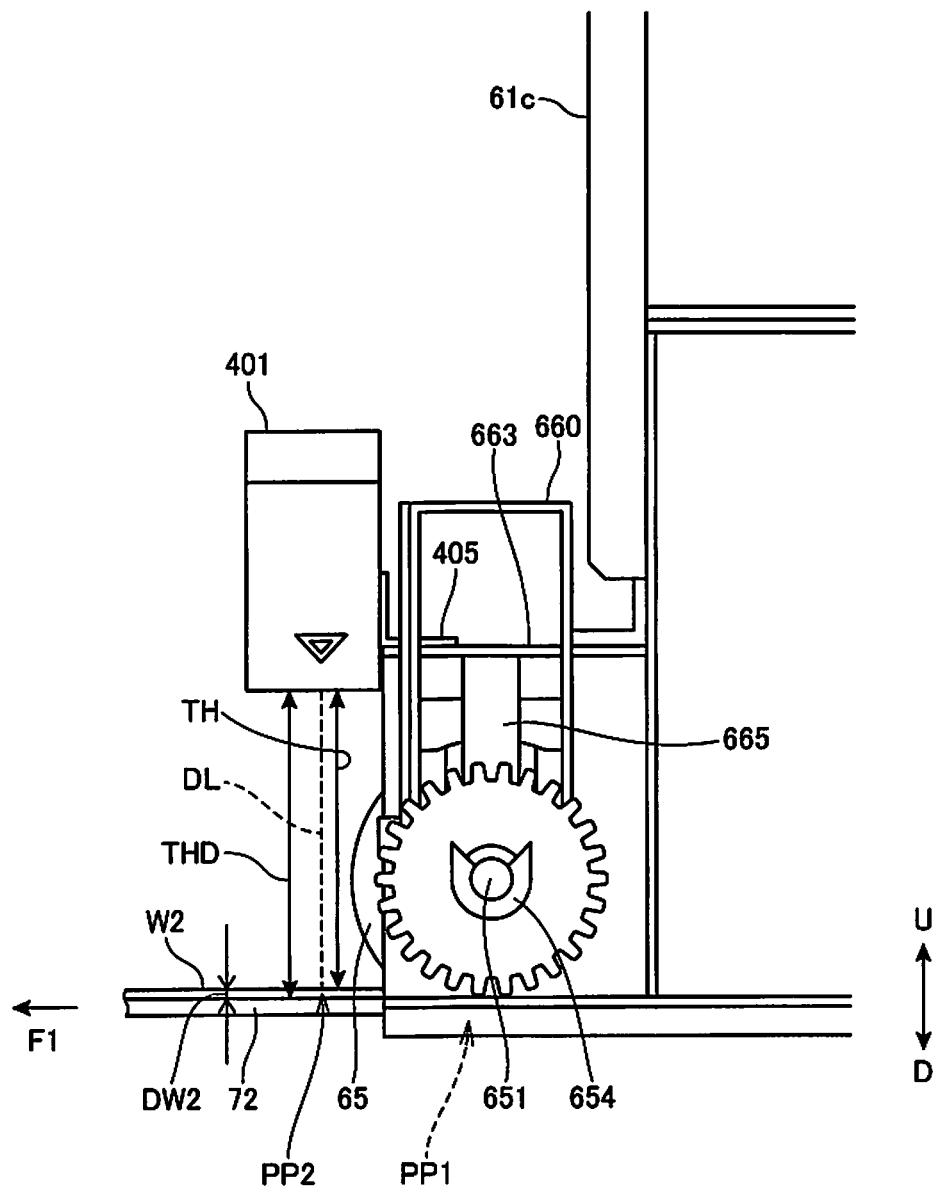
FIG. 7 is a side view of main parts of the distributor in the first embodiment of the invention.

FIG. 6 is a perspective view of the main parts of the distributor 60, and FIG. 7 is a side view of main parts of the distributor 60.

The roller unit 650 has a roller frame 660 that supports the second seal roller 65. As shown in FIG. 1, the second seal roller 65 closes the opening 638 on the downstream side of the distribution drum 61 in the conveyance direction F1.

As described above, the second seal roller 65 is disposed outside the housing 63 to close the opening 638 formed at the bottom of the housing 63.

The surface of the second seal roller 65 is configured by synthetic resin, and is preferably configured with an elastomer or other elastic material.

The second cleaner 656 is a synthetic resin or rubber blade that contacts the surface of the second seal roller 65, and with the blade wipes off fiber and particles sticking to the second seal roller 65.

The support structure that supports the second seal roller 65 includes a roller frame 660, subframe 663, and coil spring 665.

The subframe 663 is a frame affixed to the front panel 61*c* forming the front of the distribution drum 61. The subframe 663 is disposed at the bottom of the distribution drum 61, and extends along the width direction WD. The subframe 663 extends to the downstream side of the distribution drum 61 in the conveyance direction F1, and supports various members.

The roller frame 660 is an open frame that supports the roller shaft 651, which is the rotational axis of the second seal roller 65.

A gear 652 is fit onto the end of the roller shaft 651, and as shown in FIG. 7 the gear 652 is held on the roller shaft 651 by a retaining ring 654.

The gear 652 is connected to a motor or drive gear not shown, and the roller shaft 651 turns according to the torque transferred to the gear 652.

By driving the gear 652, the second seal roller 65 turns at a rotational speed corresponding to the movement of the mesh belt 72 in the conveyance direction F1. More specifically, the speed of the second web W2 in the conveyance direction F1, and the speed of the surface of the second seal roller 65, are controlled by the controller 110 to substantially the same speed. As a result, even if the second seal roller 65 contacts the second web W2, the surface of the second web W2 is not disrupted, and the second web W2 can be conveyed consistently because the second seal roller 65 does not interfere with conveyance of the second web W2.

A bearing block 653 supporting the roller shaft 651 is affixed to the end of the roller frame 660. The bearing block 653 is a bearing that supports the roller shaft 651 freely rotatably, and in this example supports the roller shaft 651 by a bearing not shown in the figure.

The bearing block 653 is connected to the subframe 663 through a coil spring 665. The coil spring 665 is a compression spring, expands between the subframe 663 and the bearing block 653, and applies urging force to the subframe 663 and bearing block 653. Because the subframe 663 is fastened to the frame members 631, the urging force of the coil spring 665 works in the down direction D. As a result, the coil spring 665 pushes the bearing block 653 and the second seal roller 65 toward the second web W2.

The roller frame 660 is supported on the subframe 663 through the second seal roller 65 and the coil spring 665. As a result, the roller frame 660 can move with the second seal roller 65 in the extension range of the coil spring 665.

FIG. 7 shows the configuration at one end of the roller unit 650 in the width direction WD, but the same configuration is also disposed at the other end of the roller unit 650. More specifically, both ends of the second seal roller 65 are supported by a bearing block 653, and each of the two bearing blocks 653 is connected through a coil spring 665 to the subframe 663.

Therefore, the second seal roller 65 and the roller frame 660 that supports the second seal roller 65 are respectively supported through coil springs 665 at both ends of the second seal roller 65 in the width direction WD.

Note that the roller shaft 651 may be disposed to only one of the ends of the second seal roller 65.

The second seal roller 65 contacts the second web W2 from above. The weight of the second seal roller 65 and roller frame 660, and the urging force of the coil spring 665, both work as pressure in the down direction D. In this event, the second seal roller 65 works as a pressure roller. The roller unit 650 therefore functions as a compressor and a first compressor.

Inside the internal space 62 of the housing 63 there is a large amount of air between the fibers contained in the second web W2, the fibers are randomly oriented, and the second web W2 is generally soft and fluffy. There are also numerous peaks and valleys in the top surface of the second web W2.

The second web W2 is compressed to a high density by the second seal roller 65 as it passes through the opening 638. The smoothness of the surface of the second web W2 is also increased by the peaks and valleys in the surface being compressed.

The pressure the second seal roller 65 applies to the second web W2 is less than the pressure the compression device 82 shown in FIG. 1 applies to the second web W2. The compression device 82 compresses the second web W2 to a high density to make a sheet S. If the sheets S are processed into plain paper with grammage of 60 g/m² to 80 g/m², the thickness ranges from approximately 0.08 mm to 0.14 mm. The thickness to which the second web W2 is compressed by the sheet former 80 is equivalent to the thickness of the sheets S.

Note that the compression device 82 is an example of a second compression device.

Because the pressure the second seal roller 65 applies to compress the second web W2 is lower than the pressure applied by the sheet former 80, the thickness of the second web W2 after passing through the second seal roller 65 is greater than the thickness of the sheets S. This thickness is measured by the optical detector 401.

1-6. Configuration of the Measurement Device

The construction and operation of a configuration for measuring the thickness of the second web W2 by means of the measurement device 400 is described below.

As shown in FIG. 7, each of the optical detectors 401 of the measurement device 400 is affixed by an attachment fixture 405. The attachment fixture 405 is a bracket that connects the subframe 663 and the optical detectors 401, and the optical detector 401 is attached by this configuration to the distribution drum 61.

In this embodiment of the invention three optical detectors 401 are attached to the subframe 663 by respective attachment fixtures 405. Each of the three optical detectors 401 measures the distance to the second web W2, and outputs the measurement to the controller 110. More specifically, because the thickness of the second web W2 is measured at different positions along the width direction WD, the controller 110 can calculate the distribution of the thickness of the second web W2 along the width direction WD based on the measurements.

The light beam the optical detector 401 uses to measure distance is indicated by dotted line DL in FIG. 7. This measurement beam DL is emitted from the optical detector 401 directly to the surface of the second web W2. As a result, the optical detector 401 in this embodiment of the invention measures the distance TH from the optical detector 401 to the second web W2.

The position PP2 where the optical detector 401 measures the distance TH is downstream in the conveyance direction F1 from the position PP1 where the second seal roller 65 compresses the second web W2. More specifically, the optical detector 401 measures the distance to the second web W2 after compression by the second seal roller 65.

As a result, the optical detector 401 can measure the thickness after the second web W2 is compressed to a suitably high density and roughness (peaks and valleys) in the surface of the second web W2 is smoothened by the second seal roller 65. That is, the thickness of the second web W2 can be reliably measured with high accuracy because the measurement is taken after the second web W2 is processed to a state enabling consistent measurement.

The measurement taken by the optical detector 401 is the distance TH shown in FIG. 7. This distance TH is not a value directly expressing the thickness of the second web W2. If the measurement the optical detector 401 takes when a second web W2 is not on the mesh belt 72 is reference distance THD, the thickness DW2 of the second web W2 is calculated by equation (1) below from the distance TH measured by the optical detector 401. The reference distance THD is the distance from the optical detector 401 to the surface of the mesh belt 72, that is, the accumulation surface on which the second web W2 is accumulated.

$$DW2=THD-TH \quad (1)$$

The controller 110 may compute equation (1) above. Alternatively, when the optical detector 401 is configured with an arithmetic processor for calculating the distance measurement acquired with the measurement beam DL, the optical detector 401 may compute equation (1).

In this embodiment of the invention the controller 110 computes equation (1). To execute this calculation process, the controller 110 stores data indicating the reference distance THD. The reference distance THD may differ according to the position of the optical detector 401 on the width direction WD. As a result, the controller 110 preferably stores a reference distance THD specific to each of the three optical detectors 401, and calculates equation (1) using the measurement from each optical detector 401 and the reference distance THD corresponding to each optical detector 401.

Figure 8:
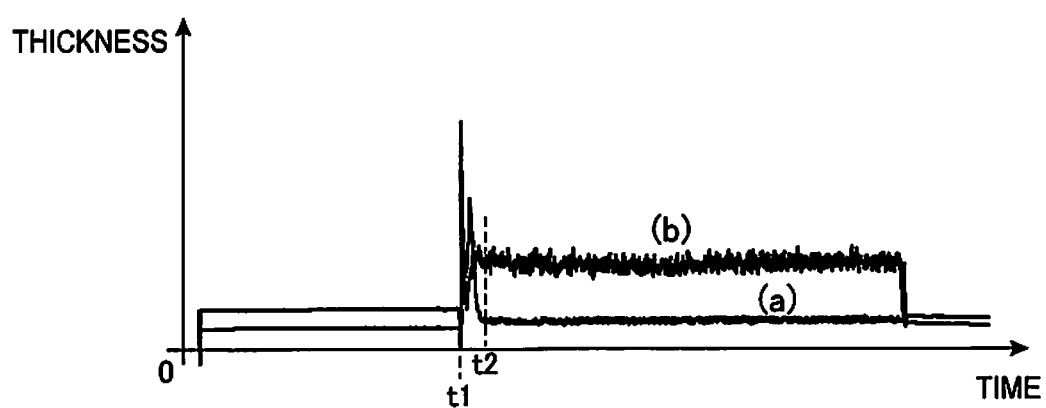
FIG. 8 is a graph showing an example of measurements taken by the optical detector in the first embodiment of the invention.

FIG. 8 is a graph shows examples of measurements taken by the optical detector 401, the Y-axis showing the measurement of the thickness of the second web W2, and the X-axis showing the passage of time.

In FIG. 8 (a) represents the measurement taken by the optical detector 401. The measurements of (a) in FIG. 8 are the measurements taken by one of the three optical detectors 401 of the sheet manufacturing apparatus 100. More specifically, the measurements indicated by (a) in FIG. 8 are the measurements of the thickness of the second web W2 taken after compression by the second seal roller 65.

For comparison, (b) indicates examples of the thickness of the second web W2 measured without compression by the second seal roller 65. These measurements (b) are the measurements of the thickness of the second web W2 taken by the optical detector 401 when the second web W2 has not been compressed by the second seal roller 65. More specifically, these are the measurements made by the optical detector 401 when the second web W2 is produced without the second seal roller 65 installed to the sheet manufacturing apparatus 100. Note that measurements (a) and measurements (b) are shown in FIG. 8 using the same scale.

The origin of the time axis in FIG. 8 is when the sheet manufacturing apparatus 100 starts manufacturing a sheet S. In the example in FIG. 8, the time axes of measurements (a) and (b) are aligned for ease of comparison. More specifically, time t1 of measurements (a) and (b) is when the second web W2 reaches the point directly below the optical detector 401.

At time t1 measurements (a) and (b) change greatly. This is because directly after second web W2 production starts, the amount of fiber that accumulates on the mesh belt 46 easily changes. These measurements (a) and (b) then stabilize at time t2.

Comparing measurements (a) and (b) after time t2, measurement (a) is less than measurement (b). This is because the second web W2 has been compressed by the second seal roller 65.

From time t2, both measurements (a) and (b) remain generally constant. More specifically, measurements (a) and (b) vary, but the variation in the measurements is contained within a specific range. Comparing the range (width) of variation, the variation in measurement (b) is great enough to confirm a clear variation. On the other hand, measurement (a) varies as does measurement (b), but the range (width) of variation is less than in measurement (b).

The change in measurements (a) and (b) is due to the peaks and valleys (roughness) in the surface of the second web W2. The optical detector 401 measures distance based on the reflection of the measurement beam DL, and the measurement changes according to whether the position to which the measurement beam DL is emitted is a valley, a peak, or a point in between. Measurement (b) is the measurement of the second web W2 when fiber has accumulated on the mesh belt 72 and is soft and fluffy. Because the difference between the peaks and valleys in the surface of the uncompressed second web W2 is great, measurement (b) also varies greatly.

When the second seal roller 65 compresses the second web W2, the density of the second web W2 at the measurement position PP2 of the optical detector 401 increases, and the peaks and valleys of the fiber become smaller. Variation in measurement (a) is therefore significantly less than in measurement (b).

If change in the measurement is great, achieving great accuracy in the measurement is difficult. For example, if the thickness of the second web W2 is monitored based on measurement (b), the thickness of the second web W2 cannot be determined to be abnormal if the thickness is within the range of variation after time t2, and abnormal detection precision does not go below the allowable range of variation. As a result, even if something that affects the thickness of the second web W2 happens, occurrence of an abnormality cannot be detected until a change in thickness exceeding the allowable range of change occurs after time t2. The detection precision of abnormal thickness when the thickness of the second web W2 is monitored based on the measurement (a) is therefore set according the range of variation in measurement (a), and is more precise than using measurement (b).

A configuration capable of acquiring measurements with little variation such as with measurement (a) can therefore quickly detect change in the thickness of the second web W2 based on the measurements from the optical detectors 401, and has the advantage of enabling managing the thickness of the second web W2 with great accuracy.

1-7. Control System of the Sheet Manufacturing Apparatus

Figure 9:
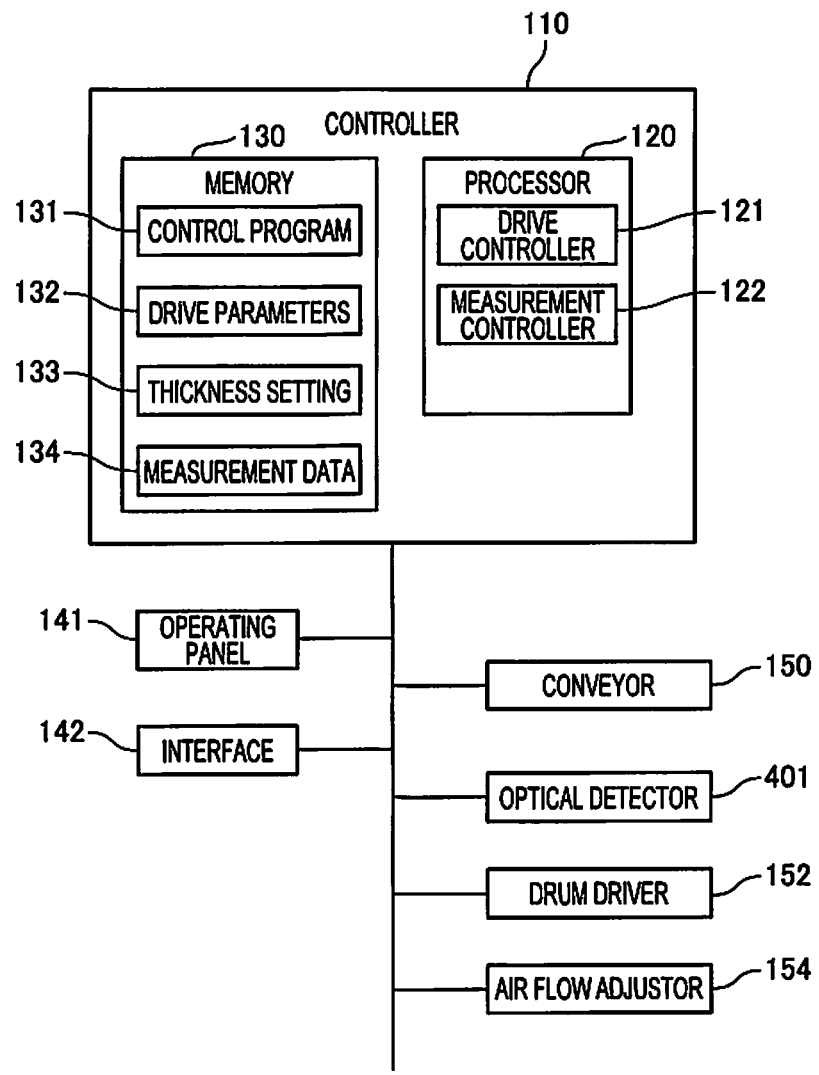
FIG. 9 is a function block diagram of a sheet manufacturing apparatus according to the first embodiment of the invention.

FIG. 9 is a block diagram illustrating the configuration of the control system of the sheet manufacturing apparatus 100.

The sheet manufacturing apparatus 100 includes a controller 110 having a processor 120 that controls parts of the sheet manufacturing apparatus 100.

The controller 110 includes a processor 120 and memory 130. The processor 120 controls parts of the controller 110 by executing a control program 131 stored in memory 130.

The memory 130 is a storage device that nonvolatilely stores programs executed by the processor 120, and data processed by the processor 120, and in this example is a semiconductor memory device. The memory 130 may also include volatile memory for temporarily storing data and programs.

An operating panel 141 for inputting to the sheet manufacturing apparatus 100, and an interface 142, are connected to the controller 110. The operating panel 141 is a touch panel configured integrally with a display panel, for example, and is disposed outside the sheet manufacturing apparatus 100. The controller 110 detects operation of the operating panel 141. The interface 142 is connected to an external device either by wire or wirelessly, and handles communication with external devices. Examples of such external devices include computer and storage devices that store data.

A conveyor 150 for operating the mesh belt 72, a drum driver 152 that drives the distribution drum 61, an air flow adjustor 154 that drives the air current adjustor 801, and the optical detector 401 are connected to the controller 110.

The conveyor 150 includes a motor (not shown in the figure) and one or more gears (not shown in the figure) for moving the mesh belt 72 in the conveyance direction F1.

Other motors and sensors that are part of the sheet manufacturing apparatus 100 are also connected to the controller 110, but these configurations are not shown in FIG. 9.

The processor 120 includes a drive controller 121 and measurement controller 122. These components are embodied by the cooperation of hardware and software, or more specifically by the processor 120 executing the control program 131 in this example.

The drive controller 121 causes parts of the sheet manufacturing apparatus 100, including the conveyor 150, to operate.

The measurement controller 122 acquires the measurements acquired by the multiple optical detectors 401. The measurement controller 122 then analyzes the measurements from the optical detectors 401, and detects the thickness of the second web W2 in the conveyance direction F1, and variation in the thickness of the second web W2 along the width direction WD.

The memory 130 stores a control program 131 executed by the processor 120. The memory 130 also stores drive parameters 132, a thickness setting 133, and measurement data 134.

The drive parameters 132 includes parameters enabling the drive controller 121 to control driving parts of the sheet manufacturing apparatus 100. The drive parameters 132 may include, for example, parameters related to the drive speed of the mesh belt 72 for the conveyor 150 to drive the mesh belt 72, and the rotational speed that the air flow adjustor 154 drives the distribution drum 61. The drive parameters 132 may also include parameters for the air flow adjustor 154 to drive the pivot shaft 803.

The thickness setting 133 includes the second web W2 thickness setting. More specifically, the thickness setting 133 includes information relates to the thickness of the second web W2 required from the perspective of maintaining the quality of the sheet S, or information defining an allowable range of thickness in the second web W2. The thickness setting 133 is used by the processor 120 to determine whether or not the measurements from the optical detector 401 are appropriate or not.

The measurement data 134 is data including the measurements the measurement controller 122 acquired from the optical detectors 401. The measurement data 134 also includes data enabling the measurement controller 122 to calculate the thickness DW2 of the second web W2 from the measurements by the optical detectors 401. More specifically, the measurement data 134 includes data indicating the reference distance THD corresponding to each of the three optical detectors 401 in the measurement device 400. The reference distances THD are the measurements the optical detectors 401 acquire when the sheet manufacturing apparatus 100 is not manufacturing a sheet S.

The measurement data 134 may also include data indicating the measurements the measurement controller 122 acquired from the optical detectors 401.

The measurement data 134 may also include data about the thickness of the second web W2 the measurement controller 122 calculated based on the measurements acquired from the optical detectors 401. For example, the measurement controller 122 may calculate the thickness of the second web W2 each time a measurement is acquired from a optical detector 401, and store the calculated thickness as measurement data 134 in the memory 130. In this event, the measurement controller 122 can execute a process to detect the change in the thickness in the conveyance direction F1, and detect deviation in the thickness in the width direction WD, based on the thickness values included in the measurement data 134.

The measurement data 134 may also include multiple measurements taken at different times of measurement, that is, measurement times, or multiple second web W2 thickness values. As a result, the measurement controller 122 can detect change over time in the thickness. This changeover time in thickness indicates change in the thickness of the second web W2 in the conveyance direction F1.

Figure 10:
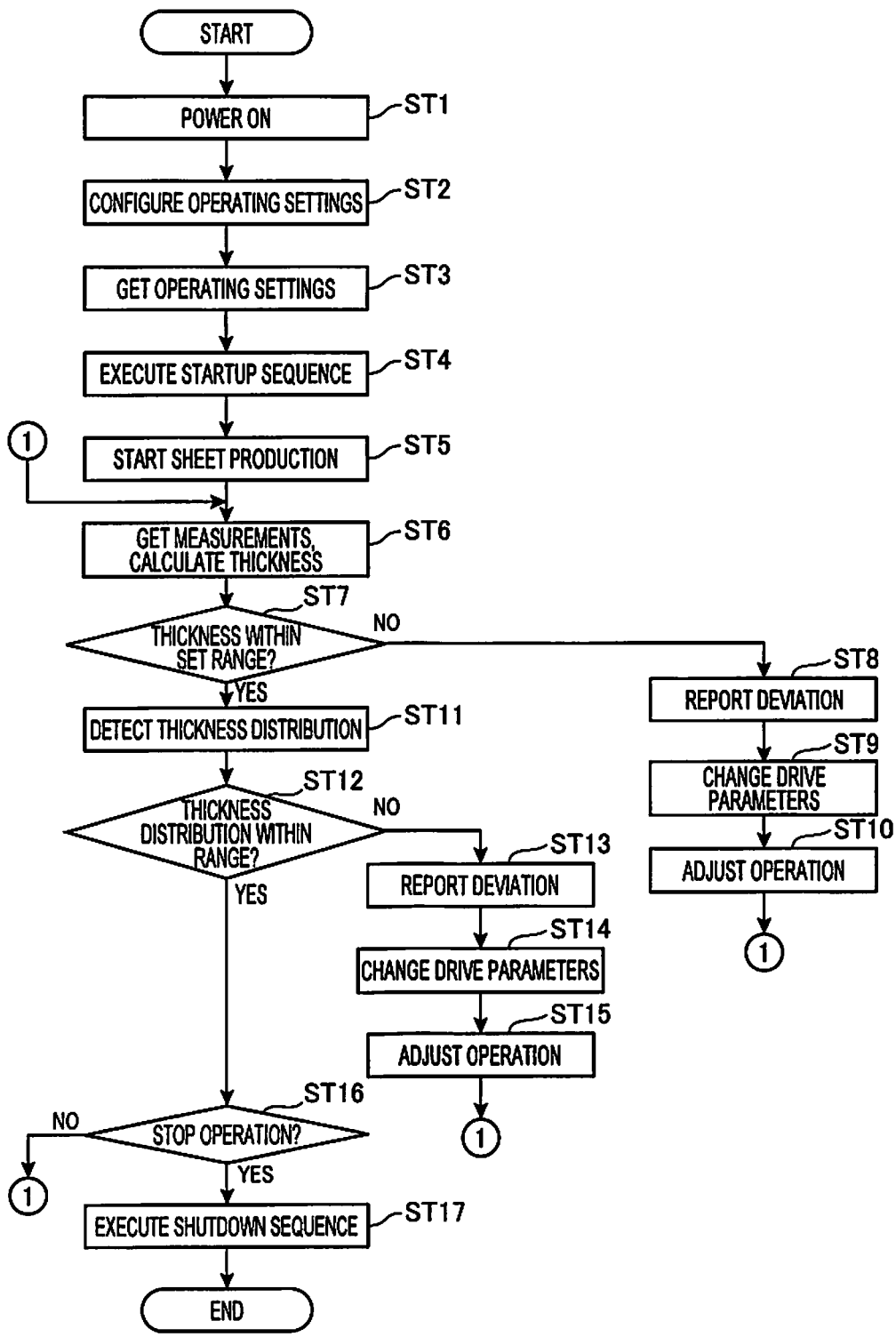
FIG. 10 is a flow chart of the operation of the sheet manufacturing apparatus according to the first embodiment of the invention.

FIG. 10 is a flow chart of the operation of the sheet manufacturing apparatus 100.

When the power of the sheet manufacturing apparatus 100 turns on (step ST1), the drive controller 121 of the controller 110 configures the operation settings of the sheet manufacturing apparatus 100 (step ST2). The settings of sheet manufacturing apparatus 100 operation are displayed in a configuration screen on the operating panel 141, and are set by the user inputting to the configuration screen. In step ST2, the number and type of sheets S for the sheet manufacturing apparatus 100 to manufacture, for example, are input by operating the operating panel 141, and the operation of the sheet manufacturing apparatus 100 is set based on the input content.

Based on the thickness setting 133 stored in the memory 130, the measurement controller 122 acquires a setting related to measuring the thickness of the second web W2 (step ST3). In this embodiment of the invention, the thickness setting 133 defines the range of acceptable measurements. More specifically, the thickness setting 133 includes information specifying a range of values determined acceptable for the thickness of the second web W2 obtained from the measurements taken by the optical detector 401.

The drive controller 121 the executes a startup sequence of initializing parts of the sheet manufacturing apparatus 100 (step ST4). The startup sequence sets the sheet manufacturing apparatus 100 to a condition enabling manufacturing sheets S. The startup sequence includes the drive controller 121 starting, in an appropriate order, the motors and blowers of the sheet manufacturing apparatus 100. After the startup sequence executes, the drive controller 121 starts manufacturing sheets S (step ST5).

After sheet S manufacturing starts, the measurement controller 122 acquires the measurements from the optical detectors 401, and calculates the thickness of the second web W2 from the acquired measurements (step ST6). In step ST6, the measurement controller 122 acquires the measurements from each of the multiple optical detectors 401 in the measurement device 400, and calculates the thickness of the second web W2 based on the measurements from each of the optical detectors 401. The measurement controller 122 also stores in the memory 130 as the measurement data 134 the measurements acquired in step ST6 and/or the calculated thickness of the second web W2.

The measurement controller 122 then determines whether or not the thickness calculated in step ST6 is a value within the setting range of the setting acquired in step ST3 (step ST7). The measurement controller 122 may make this decision by, for example, obtaining the average or median of the thickness of the second web W2 calculated based on the measurements of the multiple optical detectors 401, and determining whether or not the acquired value is within the set range.

Alternatively, the measurement controller 122 may decide based on whether or not each of the thicknesses of the second web W2 calculated based on the measurements of the multiple optical detectors 401 are within the setting range. In this event, the measurement controller 122 makes the decision in step ST7 based on whether or not the thickness of the second web W2 calculated from any one of the measurements is not a thickness within the set range.

If the measurement controller 122 determines the measured thickness is not within the range of settings (step ST7: NO), the drive controller 121 reports that the thickness is outside the allowable range by displaying a message, for example, on the screen of the operating panel 141 (step ST8). Next, the drive controller 121 changes the drive parameters of the drum driver 152 (step ST9), and adjusts the operation of the drum driver 152 based on the updated parameters (step ST10).

In step ST9, the drive parameters are changed so that the thickness of the second web W2 goes to a value within the set thickness range. For example, if the thickness of the second web W2 calculated from the measurements is thinner than the set thickness range, the drive controller 121 changes the drive parameters to increase the speed that the drum driver 152 rotationally drives the distribution drum 61. Conversely, if the thickness of the second web W2 calculated from the measurements is thicker than the set thickness range, for example, the drive controller 121 changes the drive parameters to decrease the speed that the drum driver 152 rotationally drives the distribution drum 61.

After the drive controller 121 adjusts operation of the drum driver 152 in step ST10, the controller 110 returns to step ST6.

If the measurement controller 122 determines the measured thickness is not within the range of settings (step ST7: YES), the measurement controller 122 detects the distribution of the thickness of the second web W2 along the width direction WD (step ST11).

The measurement controller 122 then determines whether or not the distribution of the thickness of the second web W2 is within the set range acquired in step ST3 (step ST12).

In step ST12 the measurement controller 122 determines, for example, whether or not the difference between the maximum and minimum thickness of the second web W2 in the width direction WD is within the set range. Alternatively, the measurement controller 122 may statistically process the thickness of the second web W2 acquired from each of the multiple measurements taken at the same time, and determine whether or not the acquired result is within the set range. For example, the measurement controller 122 may acquire the distribution or standard deviation of the thickness in the width direction WD.

If the measurement controller 122 determines the distribution of the thickness is not within the set range (step ST12: NO), the drive controller 121 reports that the distribution of thickness is outside the allowable range by displaying a message, for example, on the screen of the operating panel 141 (step ST13).

Next, the drive controller 121 changes the drive parameters of the air flow adjustor 154 (step ST14), and adjusts the operation of the air flow adjustor 154 based on the updated parameters (step ST15).

In step ST14 the drive parameters are changed so that the distribution of the thickness of the second web W2 goes to a value within the set thickness range. More specifically, the drive controller 121 changes the drive parameters to adjust the position of the flap 805 in the air current adjustor 801. In this example this drive parameter is a parameter that specifies the angle of the pivot shaft 803. This changes the ratio between the conveyance current M2 and conveyance current M3 flowing to the distribution drum 61, and thereby changes the distribution of the accumulation of mixture MX on the width direction WD. As a result, the distribution of the thickness of the second web W2 in the width direction WD is changed. After the measurement controller 122 adjusts the air flow adjustor 154 in step ST15, the controller 110 returns to step ST6.

If the measurement controller 122 determines the distribution of the thickness is within the set range (step ST12: YES), the drive controller 121 determines whether or not to stop operation of the sheet manufacturing apparatus 100 (step ST16). For example, if production of the number of sheets S set in step ST2 is completed, or if operation is stopped by an operation of the operating panel 141, the drive controller 121 determines to stop operation of the sheet manufacturing apparatus 100 (step ST16: YES).

In this event, the drive controller 121 executes a specific shutdown sequence (step ST17), and ends the process.

However, if the drive controller 121 determines to not stop operation of the sheet manufacturing apparatus 100 (step ST16: NO), the drive controller 121 returns to step ST6.

As described above, a sheet manufacturing apparatus 100 according to the first embodiment of the invention has a distributor 60 that distributes mixture MX as a mixture with material containing fiber, and a second web former 70 that forms a web by accumulating the mixture MX distributed by the distributor 60.

A mesh belt 72 functions as a conveyor that conveys the second web W2 accumulated by the second web former 70 in a conveyance direction F1.

The sheet manufacturing apparatus 100 also has a roller unit 650 that compresses the second web W2 conveyed in the conveyance direction F1.

The sheet manufacturing apparatus 100 also has a measurement device 400 configured to measure the distribution of the thickness of the second web W2 in a width direction WD, which intersects the conveyance direction F1, either while the second web W2 is being compressed by the roller unit 650, or after the second web W2 is compressed by the roller unit 650.

The sheet manufacturing apparatus 100 also has a controller 110. The controller 110 compares the measurements acquired by the measurement device 400 with a predefined thickness distribution, and controls the thickness distribution of the second web W2.

A sheet manufacturing apparatus 100 using the web forming device, web processing device, and web forming method according to the invention can, by compressing the second web W2, measure the thickness distribution of the second web W2 under appropriate conditions. The sheet manufacturing apparatus 100 compresses the second web W2 by the roller unit 650, and measures the thickness of the compressed second web W2 by the measurement device 400. As a result, the thickness can be measured after suppressing the effects of peaks and valleys due to fiber contained in the second web W2, and bulkiness in the second web W2. As a result, the thickness of the second web W2 can be measured with great accuracy. In addition, based on the measurements, the distribution of the thickness of the second web W2 in a width direction WD intersecting the conveyance direction F1 of the second web W2 can be detected with great accuracy. Therefore, by controlling the air flow adjustor 154 based on the thickness distribution of the second web W2, the thickness of the second web W2 can be desirably maintained or adjusted.

A sheet manufacturing apparatus 100 using the fibrous feedstock recycling device of the invention has a defibrator 20 that defibrates feedstock containing fiber, and uses the distributor 60 to distribute a mixture MX acquired from the defibrated material defibrated by the defibrator 20. The sheet manufacturing apparatus 100 also accumulates the mixture MX distributed by the distributor 60 and forms a second web W2 by the second web former 70, and conveys the second web W2 accumulated by the second web former 70 in the conveyance direction F1 by the mesh belt 72.

The sheet manufacturing apparatus 100 also compresses the second web W2 by the roller unit 650, and after the second web W2 is compressed by the roller unit 650, measures the thickness of the second web W2 by the measurement device 400. The measurement device 400 measures the distribution of the thickness of the second web W2 in a width direction WD intersecting the conveyance direction F1.

The sheet manufacturing apparatus 100 also has a controller 110 that compares the measurements acquired with a predefined thickness distribution, and controls the thickness distribution of the second web W2.

The sheet manufacturing apparatus 100 also functions as a fibrous feedstock recycling device that generates defibrated material MB from feedstock material MA, produces a mixture MX from the defibrated material MB, and makes sheets S from the mixture MX. In this configuration the sheet manufacturing apparatus 100 measures the thickness of the second web W2 under conditions conducive to accurate measurement, and by controlling the thickness distribution of the second web W2, desirably maintains or adjusts the thickness of the second web W2.

The quality of the sheets S manufactured by the sheet manufacturing apparatus 100 can therefore be desirably maintained. Because the air flow adjustor 154 can be quickly adjusted when the thickness distribution in the width direction WD is not within the set thickness range, the volume of sheets S produced that do not satisfy the required conditions can be suppressed. As a result, productivity can be improved by improving yield.

In the first embodiment described above the measurement device 400 is configured to measure by the optical detector 401 at a position PP2 downstream from the position PP1 where the second seal roller 65 compresses the second web W2. In this configuration the measurement device 400 measures the thickness of the second web W2 after compression by the roller unit 650, but the invention is not so limited.

For example, the measurement device 400 may be configured so that the optical detector 401 measures the displacement of the second seal roller 65. More specifically, the optical detector 401 may be configured to measure the position of the roller frame 660 that displaces in conjunction with the second seal roller 65 due to the elasticity of a coil spring 665. This configuration also enables the measurement device 400 to measure the second web W2 as it is being compressed by the roller unit 650.

The measurement device 400 of the sheet manufacturing apparatus 100 has multiple optical detectors 401 disposed along the width direction WD. The thickness distribution of the second web W2 can be accurately measured along the width direction WD based on the measurements from each of the optical detectors 401.

The sheet manufacturing apparatus 100 also has air lines 57a and 57b that carry the mixture MX to the distributor 60. The sheet manufacturing apparatus 100 also has an air current adjustor 801 and an air flow adjustor 154 that adjust the amount of mixture MX supplied to the distributor 60 by the air lines 57a and 57b as controlled by the controller 110. As a result, the controller 110 can control adjusting the distribution of mixture MX in the width direction WD inside the distribution drum 61 according to the distribution of the thickness of the second web W2 acquired from the measurements by the measurement device 400. As a result, the distribution of the thickness of the second web W2 can be desirably adjusted.

The distributor 60 has a housing 63. The housing 63 is a case enclosing the distribution drum 61, and the mesh belt 72 used as the accumulator of the second web former 70. The distributor 60 also has a distribution drum 61 that distributes the mixture MX in air inside the housing 63.

The sheet manufacturing apparatus 100 also has an air current adjustor 801 that adjusts the air flow in the width direction WD inside the housing 63 as controlled by the controller 110. This configuration enables adjusting the distribution of mixture MX in the width direction WD inside the distribution drum 61 as controlled by the controller 110, and thereby adjusting the distribution of the thickness of the second web W2. For example, the air current adjustor 801 can adjust the balance of the air flow in the width direction WD.

The sheet manufacturing apparatus 100 also has a compression device 82, and the roller unit 650 compresses the second web W2 with less pressure than applied by the compression device 82. This configuration enables measuring the thickness of the second web W2 of accumulated fiber after the second web W2 is compressed to a stable condition and before the second web W2 is compressed by the compression device 82.

In addition, because the thickness of the second web W2 is measured in the distributor 60 in a process before compression by the compression device 82, change in the amount of mixture MX accumulated on the mesh belt 72 in the distributor 60 can be quickly detected. As a result, the operating conditions of the distributor 60 can be controlled by the controller 110 to adjust only the thickness of the second web W2, operation can be quickly adjusted according to change in the thickness of the second web W2, and consistent quality in the sheet S can be promoted.

Furthermore, because the roller unit 650 compresses the web with lower pressure than applied by the compression device 82, the second web W2 can be compressed sufficiently to smoothen and level roughness in the surface of the second web W2, and variation in the thickness of the second web W2 can be measured under favorable conditions.

2. Embodiment 2

Figure 11:
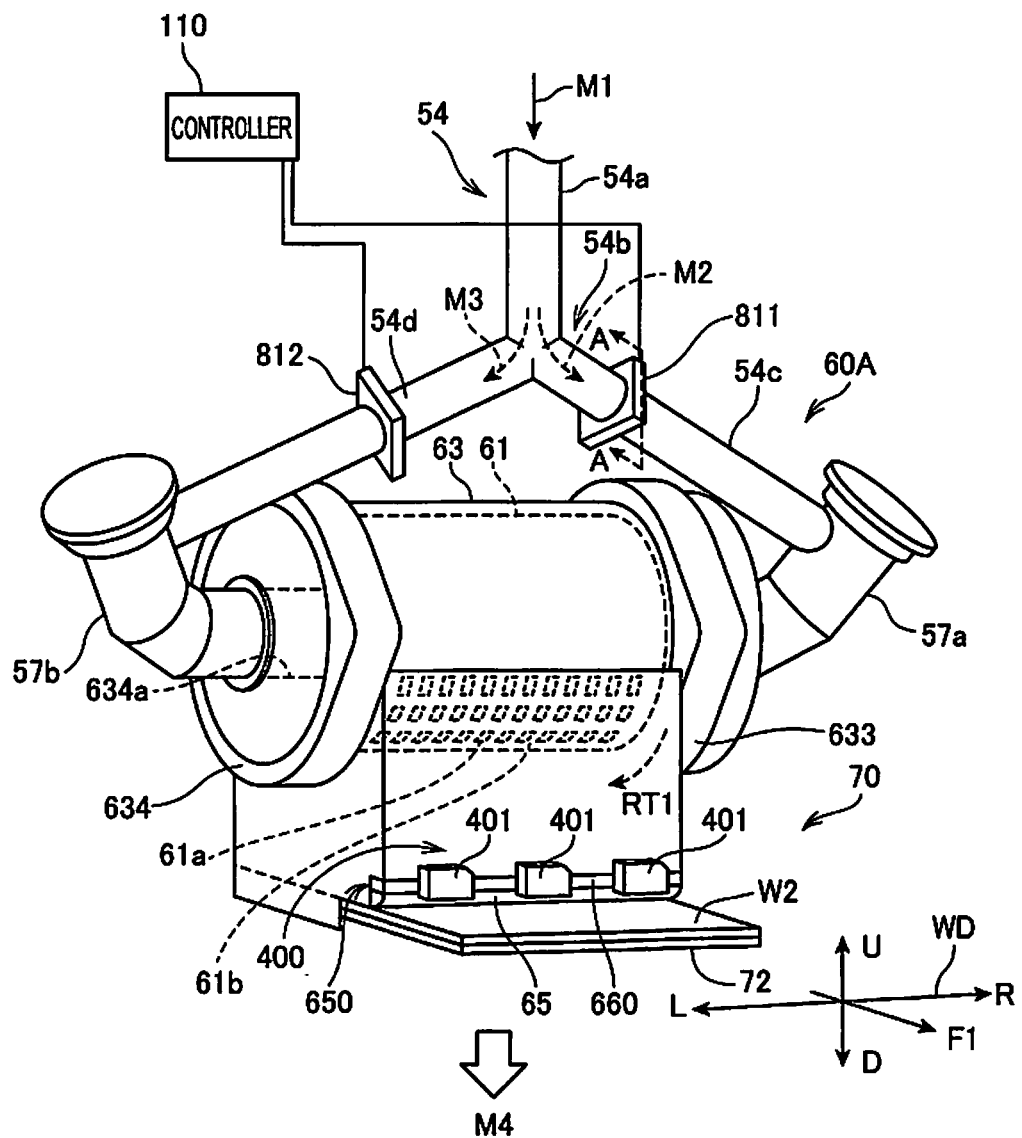
FIG. 11 is a perspective view of the distributor in a second embodiment of the invention.

FIG. 11 is a perspective view of the distributor 60A in a second embodiment of the invention.

This distributor 60A is used in the sheet manufacturing apparatus 100 instead of the distributor 60 described above. The distributor 60A has a housing 63 configured as described in the distributor 60 above, causes mixture MX to precipitate from the distribution drum 61 inside the housing 63 and accumulate on the mesh belt 72, forming a second web W2.

This distributor 60A has an air flow restrictor 811 disposed to branch conduit 54c, and another air flow restrictor 812 disposed to branch conduit 54d, and does not have the air current adjustor 801 shown in FIG. 2. In other words, the distributor 60A uses air flow restrictors 811 and 812 instead of an air current adjustor 801. Parts of the distributor 60A other than the air flow restrictors 811 and 812 are the same as the distributor 60 described above, are therefore identified by the same reference numerals, and further description thereof is omitted.

The airflow restrictor 811 disposed to branch conduit 54c operates as controlled by the controller 110, and changes the sectional area of the path through which the conveyance current M2 flows inside the branch conduit 54c.

Figure 12:
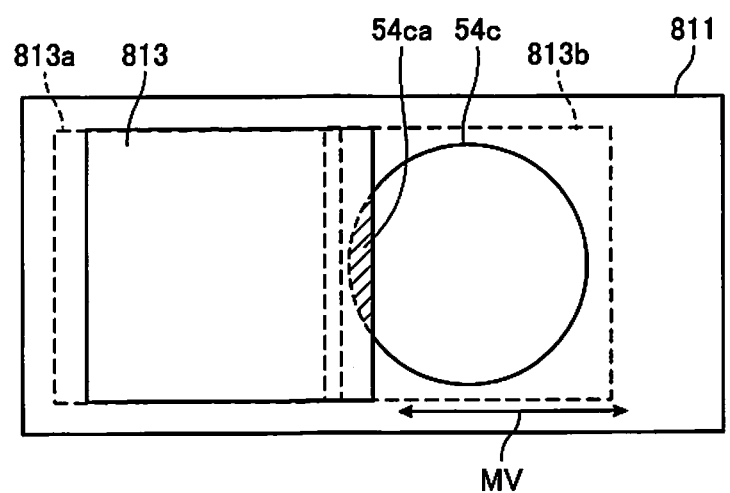
FIG. 12 is a section view illustrating the configuration of the air flow restrictor in the second embodiment of the invention.

FIG. 12 is a section view of the configuration of the air flow restrictor 811 through line A-A in FIG. 11.

As shown in FIG. 12, the air flow restrictor 811 has a shutter 813. The shutter 813 in this example is a plate that moves bidirectionally in the directions indicated by the arrow MV. The shutter 813 is a rigid panel with strength sufficient to obstruct at least the passage of conveyance current M2.

The range of shutter 813 movement overlaps the branch conduit 54c. When the shutter 813 overlaps the branch conduit 54c, the conveyance current M2 cannot pass through the part 54ca blocked by the shutter 813. More specifically, the shutter 813 limits the sectional area of the path of the conveyance current M2 through the branch conduit 54c. By changing the position of the shutter 813, the sectional area of the path through the branch conduit 54c can be changed.

In the configuration shown in the example in FIG. 12, the shutter 813 can move to any position from position 813a where the shutter 813 is not overlapping (closing) any part of the branch conduit 54c, and position 813b where the shutter 813 completely closes the branch conduit 54c. In this example, the maximum sectional area of the path of the conveyance current M2 through the air flow restrictor 811 is the same as the sectional area of the branch conduit 54c, and the minimum is zero.

The air flow restrictor 811 can move the shutter 813 by an actuator not shown. The actuator of the air flow restrictor 811 is equivalent to the air flow adjustor 154 shown in FIG. 9. The air flow restrictor 811 can therefore change the sectional area of the path through the branch conduit 54c by moving the shutter 813 as controlled by the controller 110.

The other air flow restrictor 812 is configured identically to air flow restrictor 811. The air flow restrictor 812 can change the sectional area of the path of the conveyance current M3 through the branch conduit 54d as controlled by the controller 110.

By changing the sectional area of the paths of the air flow restrictors 811 and 812, the flow resistance of the conveyance currents M2 and M3 through the branch conduits 54c and 54d also changes. A difference in the flow resistance of the conveyance current M2 and conveyance current M3 produces a difference in the size of conveyance current M2 and conveyance current M3 flowing from the conveyance current M1. More specifically, by adjusting the ratio between the sectional area of the path through air flow restrictor 811, and the sectional area of the path through air flow restrictor 812, the balance between the size of conveyance current M2 and conveyance current M3 can be adjusted.

The airflow restrictors 811 and 812 in this configuration are examples of an air flow adjustor and an adjustor in the accompanying claims.

The distributor 60A configured as described above has the same operational effect as the distributor 60 in the first embodiment.

In addition, in a sheet manufacturing apparatus 100 employing the web forming device, web processing device, and fibrous feedstock recycling device of the invention, the controller 110 controls the air flow restrictors 811 and air flow restrictor 812 in the configuration using the distributor 60A. This controls the amount of mixture MX supplied from the air lines 57a and 57b to the distributor 60. More specifically, the distribution of mixture MX along the width direction WD in the distribution drum 61 can be adjusted by controlling the air flow restrictors 811 and 812. The distribution of the thickness of the second web W2 can therefore be desirably adjusted.

3. Embodiment 3

Figure 13:
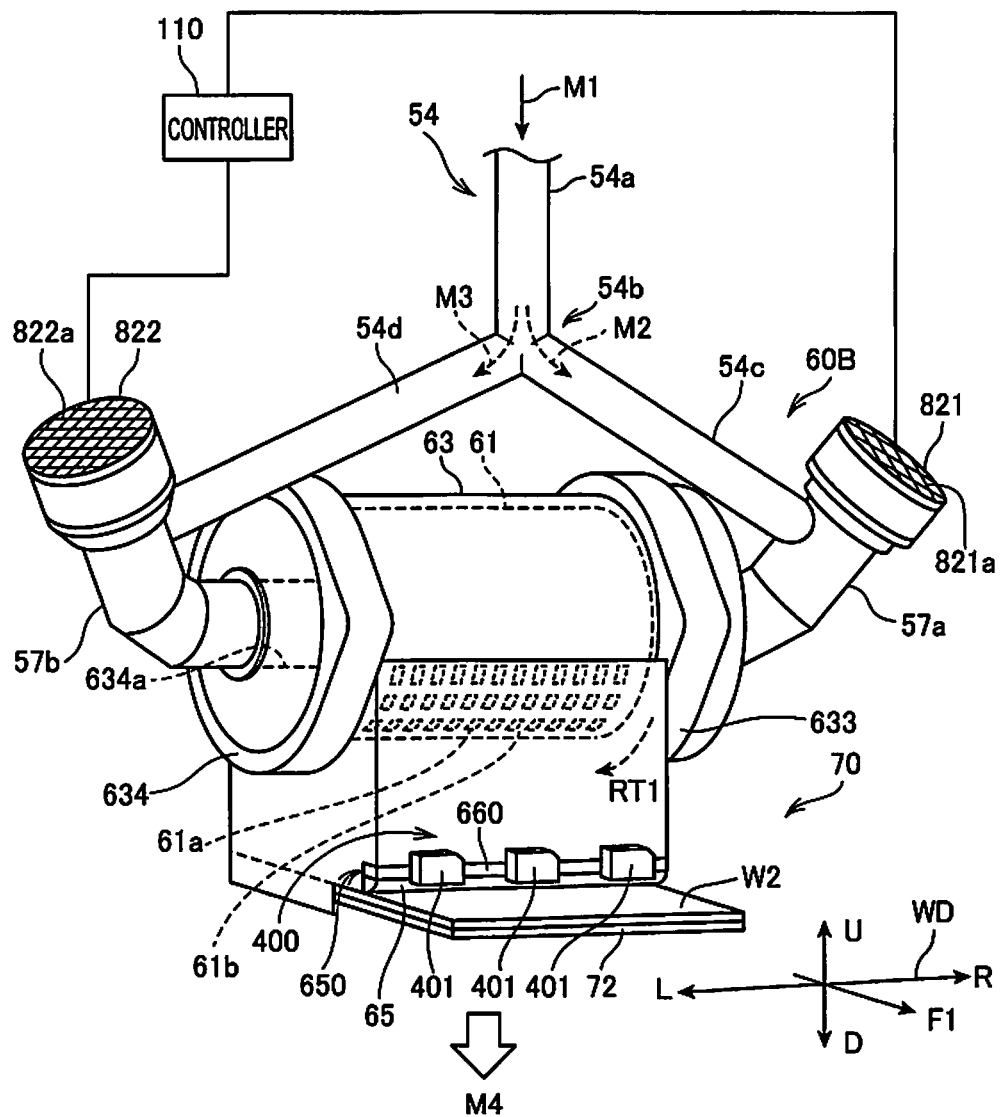
FIG. 13 is a perspective view of the distributor in a third embodiment of the invention.
Figure 14:
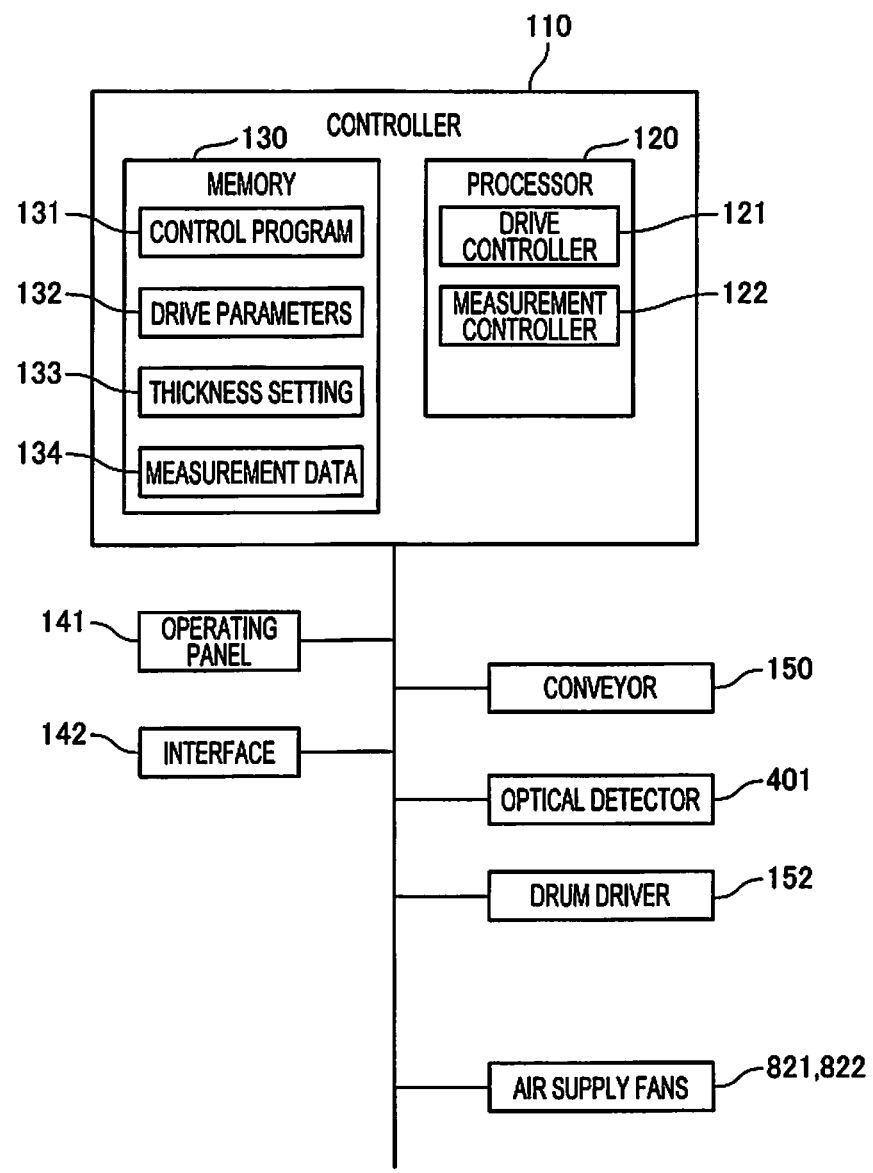
FIG. 14 is a function block diagram of a sheet manufacturing apparatus according to the third embodiment of the invention.

FIG. 13 is a perspective view of the distributor 60B in a third embodiment of the invention, and FIG. 14 is a function block diagram of the sheet manufacturing apparatus 100 according to the third embodiment of the invention.

This distributor 60B is used in the sheet manufacturing apparatus 100 instead of the distributor 60 described above. The distributor 60B has a housing 63 configured as described in the distributor 60 above, and causes mixture MX to precipitate from the distribution drum 61 inside the housing 63 and accumulate on the mesh belt 72, forming a second web W2.

This distributor 60B uses air supply fans 821 and 822 instead of air flow restrictors 811 and 812 described in the second embodiment above. Parts of the distributor 60B other than the air supply fans 821 and 822 are the same as the distributor 60 described above, are therefore identified by the same reference numerals, and further description thereof is omitted.

Air supply fan 821 is a fan disposed to air line 57a for blowing air from outside the distributor 60B into the air line 57a. The air supply fan 821 has an inlet 821a that opens to the outside of the distributor 60B, and supplies air suctioned from the inlet 821a into the housing 63.

Air supply fan 822 s a fan disposed to air line 57b for blowing air from outside the distributor 60B into the air line 57b. The air supply fan 822 has an inlet 822a that opens to the outside of the distributor 60B, and supplies air suctioned from the inlet 822a into the housing 63.

The air supply fans 821 and 822 both push air in the direction to the distribution drum 61. Because the air current supplied by the air supply fans 821 and 822 is air pulled from outside the housing 63, the air current does not carry any mixture MX. In this embodiment, a configuration that supplies humidified air such as described in the first embodiment may be disposed outside of the housing 63, for example.

As shown in FIG. 14, air supply fan 821 and air supply fan 822 are connected to a controller 110. The controller 110 controls turning rotation of the fan motor not shown of the air supply fan 821 on and off. Further preferably, the controller 110 also controls the rotational speed of the fan motor of the air supply fan 821.

The controller 110 also controls turning rotation of the fan motor not shown of air supply fan 822 on and off. Further preferably, the controller 110 also controls the rotational speed of the fan motor of the air supply fan 822.

The air current supplied by the air supply fan 821 flows with the conveyance current M2 into the distribution drum 61. The air current supplied by the air supply fan 822 flows with the conveyance current M3 into the distribution drum 61. As a result, the volume and/or the air speed of the air currents flowing from the right R and left L sides into the distribution drum 61 changes according to the air current supplied by air supply fan 821 and the air current supplied by air supply fan 822.

The air currents from the air supply fans 821 and 822 also change the amount of air not carrying mixture MX that flows into the distribution drum 61.

By the controller 110 controlling the air supply fans 821 and 822, these changes can be used to adjust the distribution of the mixture MX in the width direction WD inside the distribution drum 61. As a result, the air supply fans 821 and 822 function as air flow adjustors in the invention, and adjust the distribution in the width direction WD of the mixture MX falling from the distribution drum 61 onto the mesh belt 72. This adjustment can be controlled by the controller 110 controlling turning the air supply fan 821 and air supply fan 822 on and off. In addition, the controller 110 can adjust the distribution in fine increments by controlling the speed of air supply fan 821 and air supply fan 822 separately.

The distributor 60B thus comprised has the same operational effect as the distributor 60 of the first embodiment.

In addition, in a sheet manufacturing apparatus 100 employing the web forming device, web processing device, and fibrous feedstock recycling device of the invention, the controller 110 controls the air supply fan 821 and air supply fan 822 in the configuration using the distributor 60B. As a result, the distribution of mixture MX falling from the distribution drum 61 onto the mesh belt 72 can be adjusted along the width direction WD, and the distribution of the thickness of the second web W2 can therefore be desirably adjusted.

4. Embodiment 4

Figure 15:
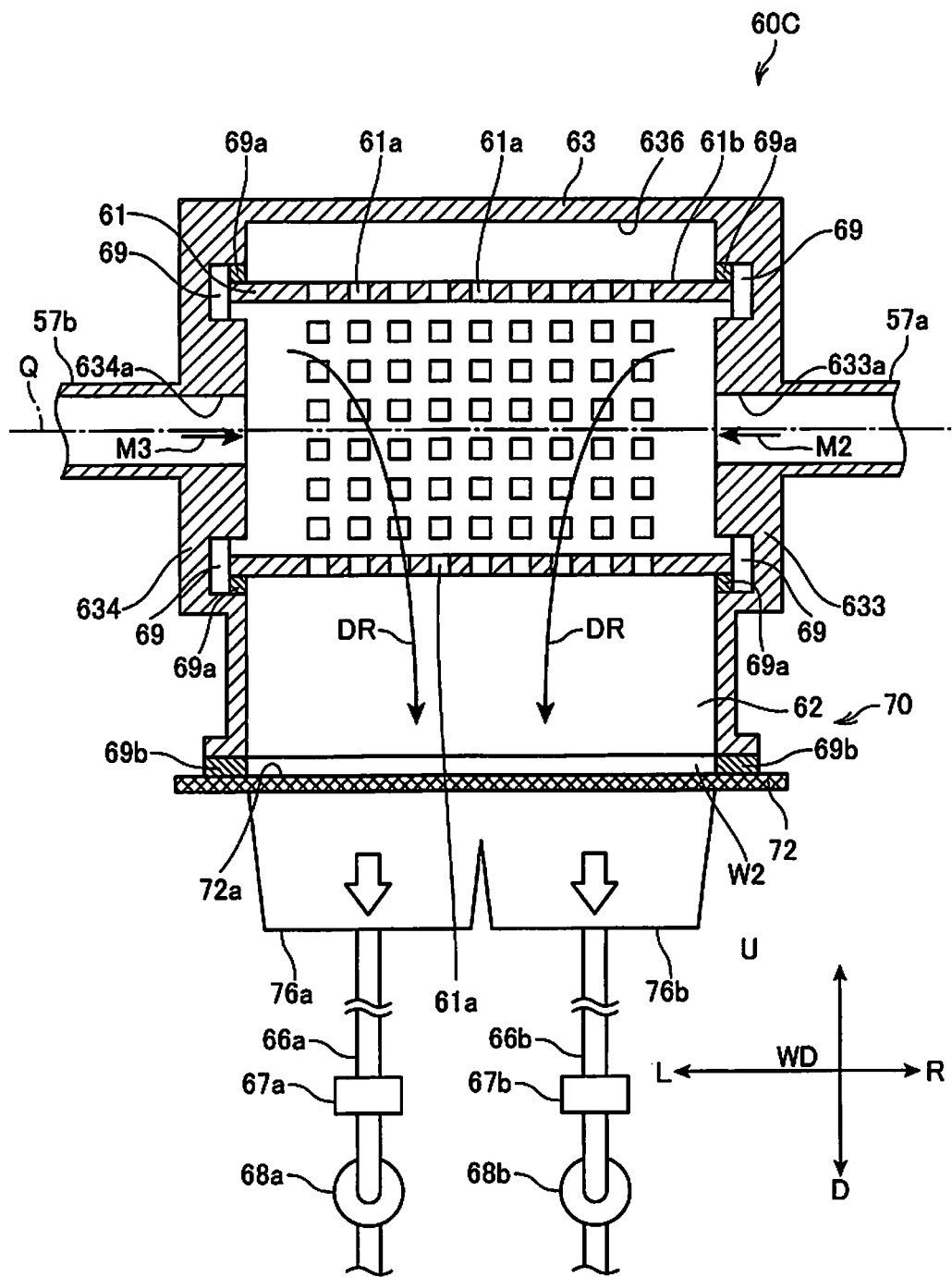
FIG. 15 is a perspective view of the distributor in a fourth embodiment of the invention.

FIG. 15 is a perspective view of the distributor 60C in a fourth embodiment of the invention.

This distributor 60C is used in the sheet manufacturing apparatus 100 instead of the distributor 60 described above. The distributor 60C has a housing 63 configured as described in the distributor 60 above, and causes mixture MX to precipitate from the distribution drum 61 inside the housing 63 and accumulate on the mesh belt 72, forming a second web W2.

This distributor 60C is configured without the air flow restrictor 811 of the distributor 60 described above. The distributor 60C also has suction mechanisms 76a and 76b disposed below the mesh belt 72 to suction air through the mesh belt 72. Parts of the distributor 60C other than the suction mechanisms 76a and 76b are the same as the distributor 60 described above, are therefore identified by the same reference numerals, and further description thereof is omitted.

Suction mechanism 76a and suction mechanism 76b are disposed side by side on the width direction WD below the mesh belt 72.

Suction mechanism 76a is connected to a third dust collector 67a through a conduit 66a. The third dust collector 67a is connected to a third collection blower 68a. Like the second collection blower 68 described above, the third collection blower 68a suctions air as controlled by the controller 110, and discharges through a discharge line to the outside of the sheet manufacturing apparatus 100. The third dust collector 67a is a filter that traps fiber and particles carried in the air current suctioned from the distributor 60C through the suction mechanism 76a.

Suction mechanism 76b is connected to a fourth dust collector 67b through a conduit 66b. The fourth dust collector 67b is connected to a fourth collection blower 68b. Like the second collection blower 68 described above, the fourth collection blower 68b suctions air as controlled by the controller 110, and discharges through a discharge line to the outside of the sheet manufacturing apparatus 100. The fourth dust collector 67b is a filter that traps fiber and particles carried in the air current suctioned from the distributor 60C through the suction mechanism 76b.

The third collection blower 68a and fourth collection blower 68b are controlled separately by the controller 110. The controller 110 controls turning rotation of the blower motor not shown of the third collection blower 68a on and off. Further preferably, the controller 110 also controls the rotational speed of the blower motor of the third collection blower 68a.

The controller 110 ALSO controls turning rotation of the blower motor not shown of the second collection blower 68 on and off. Further preferably, the controller 110 also controls the rotational speed of the blower motor of the fourth collection blower 68b.

The rotational speed of the blower motor of the third collection blower 68a determines the amount and speed of the left-side suction current, that is, the suction current on the left side of the width direction WD of the mesh belt 72.

Likewise, the rotational speed of the blower motor of the fourth collection blower 68b determines the amount and speed of the right-side suction current, that is, the suction current on the right side of the width direction WD of the mesh belt 72.

Therefore, by controlling the rotational speed of the blower motors of the third collection blower 68a and fourth collection blower 68b, the controller 110 can change the balance in the width direction WD between the suction currents flowing down from the distribution drum 61. Changing this balance changes the distribution in the width direction WD of the mixture MX falling from the distribution drum 61.

As a result, the third collection blower 68a and fourth collection blower 68b function as air flow adjustors in the invention, and adjust the distribution in the width direction WD of the mixture MX falling from the distribution drum 61 onto the mesh belt 72. This adjustment can be controlled by the controller 110 controlling turning the third collection blower 68a and fourth collection blower 68b on and off. In addition, the controller 110 can adjust the distribution in fine increments by controlling the speed of third collection blower 68a and fourth collection blower 68b separately.

In this configuration, the suction mechanisms 76a and 76b function as air flow adjustors.

The distributor 60C thus comprised has the same operational effect as the distributor 60 of the first embodiment.

In addition, in a sheet manufacturing apparatus 100 employing the web forming device, web processing device, and fibrous feedstock recycling device of the invention, the controller 110 controls the third collection blower 68a and fourth collection blower 68b in the configuration using the distributor 60C. As a result, the distribution of mixture MX falling from the distribution drum 61 onto the mesh belt 72 can be adjusted along the width direction WD, and the distribution of the thickness of the second web W2 can therefore be desirably adjusted.

The fourth embodiment of the invention describes a configuration that suctions by means of suction mechanisms 76a and 76b below the mesh belt 72, but the invention is not so limited. For example, there may be three or more suction mechanisms displayed below the mesh belt 72, and the volume and/or speed of the currents suctioned by these suction mechanisms may be separately controlled by the controller 110.

5. Embodiment 5

Figure 16:
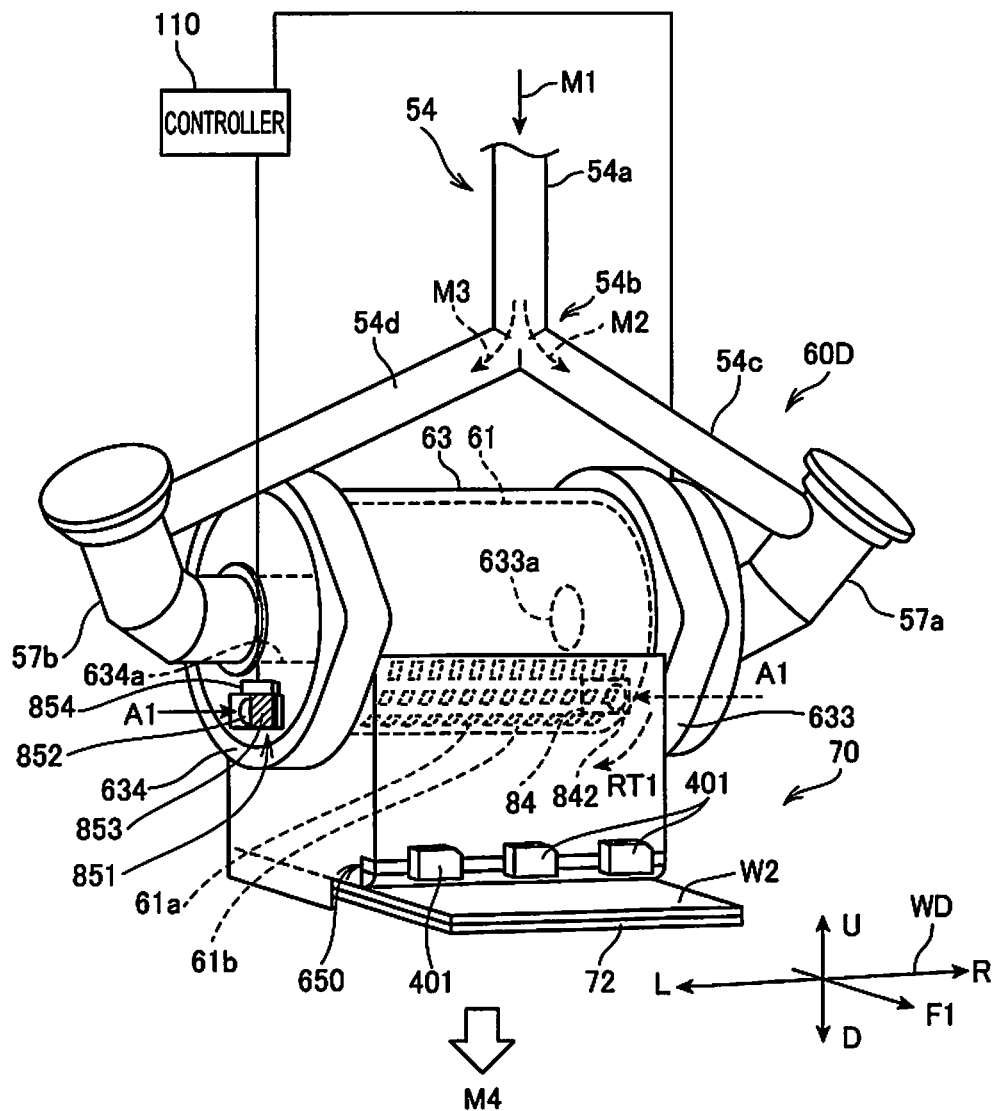
FIG. 16 is a perspective view of the distributor in a fifth embodiment of the invention.
Figure 17:
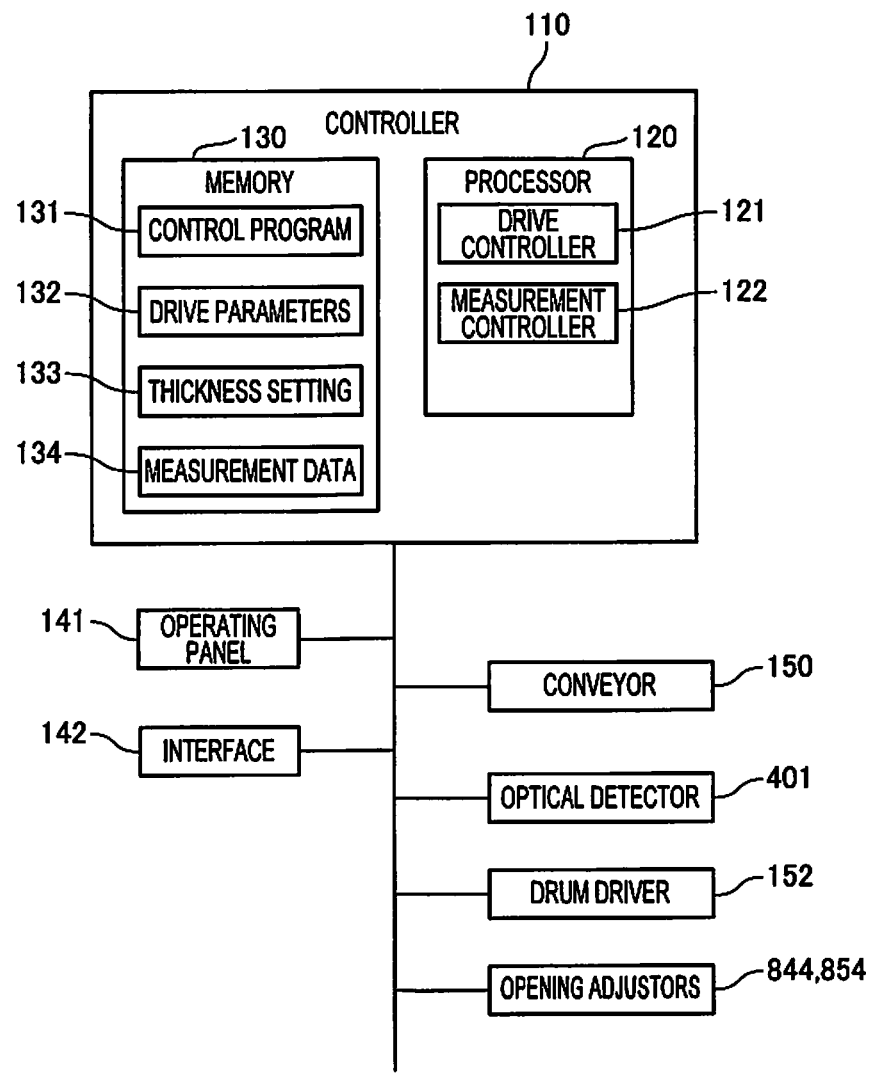
FIG. 17 is a function block diagram of a sheet manufacturing apparatus according to the fifth embodiment of the invention.

FIG. 16 is a perspective view of the distributor 60D in a fifth embodiment of the invention, and FIG. 17 is a function block diagram of a sheet manufacturing apparatus 100 according to the fifth embodiment of the invention.

This distributor 60D is used in the sheet manufacturing apparatus 100 instead of the distributor 60 described above. The distributor 60D has a housing 63 configured as described in the distributor 60 above, and causes the mixture MX to precipitate from the distribution drum 61 inside the housing 63 and accumulate on the mesh belt 72, forming a second web W2.

This distributor 60D is configured with air flow restrictors 841 and 851 instead of the air flow restrictor 811 of the first embodiment described above. Parts of the distributor 60C other than the air flow restrictors 841 and 851 are the same as the distributor 60 described above, are therefore identified by the same reference numerals, and further description thereof is omitted.

Air flow restrictor 841 is disposed to the right wall 633, and has an opening 842 that connects the outside of the housing 63 to the internal space 62.

Air flow restrictor 851 is disposed to the left wall 634, and has an opening 852 that connects the outside of the housing 63 to the internal space 62. This air flow restrictor 851 also has a movable door 853 that opens and closes the opening 852.

The movable door 853 is a door that can move between a position completely closing the opening 852, and a position maximally opening the opening 852, and is driven by an opening adjustor 854.

The opening adjustor 854 is an actuator that moves the movable door 853, operates as controlled by the controller 110, and operates the movable door 853.

The other air flow restrictor 841 is not shown in the figure, but has a movable door identical to the movable door 853, and drives the movable door by means of the opening adjustor 844 shown in FIG. 17. The opening adjustor 844 is an actuator configured identically to opening adjustor 854.

When the opening 842 is not closed, outside air A1 is suctioned into the internal space 62 from outside the housing 63 by suction produced by the suction mechanism 76.

Likewise, when opening 852 is not closed, outside air A1 is suctioned into the internal space 62 from outside the housing 63 by suction produced by the suction mechanism 76.

The volume and/or speed of the outside air A1 suctioned through the openings 842, 852 is determined by the width (size) of the openings 842, 852. More specifically, if the size of the openings 842, 852 changes, the flow resistance to the flow of outside air A1 through the openings 842, 852 changes.

For example, suppose the suction of the suction mechanism 76 remains constant, and the volume of the conveyance currents M2 and M3 supplied from the conduit 54 to the housing 63 remains constant. In this case, depending on the magnitude of the flow resistance through the openings 842, 852, the volume and/or speed of the outside air A1 suctioned from the openings 842, 852 changes.

The outside air A1 flowing from the openings 842, 852 does not contain the mixture MX. In this embodiment, a configuration that supplies humidified air such as described in the first embodiment may be disposed outside of the housing 63, for example, and the outside air A1 may be humidified air.

As shown in FIG. 17, the opening adjustors 844 and 854 are connected to a controller 110. The controller 110 separately controls the opening adjustors 844 and 854 to move the movable door of the air flow restrictor 841 and movable door 853. The width of the opening 842 and the width of the opening 852 can therefore be separately adjusted.

When the widths of the openings 842, 852 are adjusted, the volume and/or speed of the outside air A1 flowing from the right R and left R to the distribution drum 61 change.

The outside air A1 passing through opening 842 produces an air current from the right R flowing downward through the internal space 62 to the space toward the mesh belt 72 to which the mixture MX descends.

The outside air A1 passing through opening 852 likewise produces an air current from the left L flowing downward through the internal space 62 to the space toward the mesh belt 72 to which the mixture MX descends.

By changing the ratio between the outside air A1 flowing in from the opening 842 and the outside air A1 flowing in from the opening 852, the distribution of the mixture MX falling to the mesh belt 72 can be adjusted along the width direction WD. This adjustment can be made by the controller 110 driving the opening adjustors 844 and 854 to appropriately open and close the openings 842, 852 as described above.

By the controller 110 adjusting the size (width) of the open area of the openings 842, 852, the distribution of the mixture MX accumulated in the width direction WD on the mesh belt 72 can be adjusted more precisely.

The distribution of the amount of mixture MX, that is, the distribution of the accumulated thickness, in the width direction WD of the second web W2 accumulated on the mesh belt 72 can thus be controlled by the controller 110 in the fifth embodiment of the invention.

In this configuration, the air flow restrictors 841 and 851 function as air flow adjustors.

The distributor 60D thus comprised has the same operational effect as the distributor 60 of the first embodiment.

In addition, in a sheet manufacturing apparatus 100 employing the web forming device, web processing device, and fibrous feedstock recycling device of the invention, the controller 110 controls the opening adjustors 844 and 854 in the configuration using the distributor 60D. As a result, the distribution of mixture MX falling from the distribution drum 61 onto the mesh belt 72 along the width direction WD can be adjusted, and the distribution of the thickness of the second web W2 can therefore be desirably adjusted.

7. Other Embodiments

The embodiments described above are only examples of specific embodiments of the invention as described in the accompanying claims, do not limit the invention, and can be varied in many ways as described below without departing from the scope and spirit of the invention as described in the accompanying claims.

The foregoing embodiments describe configurations that measure the thickness of the second web W2 by a measurement device 400 at a position downstream in the conveyance direction F1 from the position where the second web W2 is compressed by a roller unit 650, but the invention is not so limited. For example, the measurement device 400 may measure the thickness of the second web W2 while the second web W2 is being compressed by the roller unit 650.

The foregoing embodiments describe configurations in which the measurement device 400 has multiple optical detectors 401, and based on the measurements taken by each optical detector 401, the controller 110 determines the distribution of the thickness of the second web W2 in the width direction WD, but the invention is not so limited.

For example, the roller unit 650 may be configured with the second seal roller 65 supported to tilt according to the distribution of the thickness of the second web W2 in the width direction WD, and the measurement device 400 configured with sensors that detect the angle of this inclination. In this case, the distribution of the thickness of the second web W2 in the width direction WD can be measured by the one or multiple sensors that detect the slope of the second seal roller 65.

The foregoing embodiments also describe as configurations for compressing the second web W2 configurations that apply pressure by means of a second seal roller 65, but the invention is not so limited. For example, the second web W2 may be compressed by pushing a flat pressure member against the second web W2 from above the mesh belt 72. A suction mechanism that suctions air from below the mesh belt 72, and produces an air flow passing through the mesh belt 72 and second web W2 may also be provided. In this event, the second web W2 is compressed by the flow resistance of the air current flowing down through the second web W2 from above.

The materials and other details about the distributors 60, 60A, 60B, 60C, and 60D described in the foregoing embodiments may also be appropriately modified as desired.

Of the air current adjustor 801, air flow restrictors 811 and 812, air supply fans 821 and 822, air flow restrictors 841 and 851, and suction mechanisms 76a and 76b described above, configurations having multiple mechanisms desirably combined in the distributor 60 are also conceivable.

The foregoing embodiments describe, as a fibrous feedstock recycling device according to the invention, a dry process sheet manufacturing apparatus 100 that acquires material by defibrating feedstock in air, and uses the defibrated material to manufacture sheets S. However, the invention is not so limited, and may also be applied to electrostatic sheet manufacturing apparatuses that attract material containing fiber defibrated in air to the surface of a drum by static attraction, and manufacture the material attracted to the drum into sheets.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No: 2018-128782, filed Jul. 6, 2018 is expressly incorporated by reference herein.

What is claimed is:

1. A web forming device comprising:
a distributor configured to disperse material containing fiber;
an accumulator configured to accumulate the material dispersed by the distributor and form a web;
a conveyor configured to convey the web in a first direction;
a compression device configured to compress the web conveyed in the first direction;
a measurement device configured to measure a thickness distribution of the web in a second direction intersecting the first direction while the web is being compressed by the compression device, or after the web is compressed by the compression device; and
a controller configured to compare measurements from the measurement device with a previously set thickness distribution, and control the thickness distribution of the web.

2. The web forming device described in claim 1, further comprising:
a plurality of measurement devices disposed along the second direction.

3. The web forming device described in claim 1, further comprising:
a plurality of material suppliers that supply the material to the distributor; and
an adjustor configured to adjust an amount of the material supplied to the distributor from the plurality of suppliers as controlled by the controller.

4. The web forming device described in claim 1, wherein:
the distributor has a distribution drum that disperses the material, and a case surrounding a space between the distribution drum and the accumulator, and disperses the material in air inside the case, and
an air flow adjustor configured to adjust an air flow in the second direction inside the case as controlled by the controller.

5. A web processing device comprising:
a distributor configured to disperse material containing fiber;
an accumulator configured to accumulate the material dispersed by the distributor and form a web;
a conveyor configured to convey the web in a first direction;
a first compression device configured to compress the web conveyed in the first direction;
a measurement device configured to measure a thickness distribution of the web in a second direction intersecting the first direction while the web is being compressed by the first compression device, or after the web is compressed by the first compression device;
a controller configured to compare measurements from the measurement device with a previously set thickness distribution, and control the thickness distribution of the web; and
a second compression device configured to compress the web after measurement by the measurement device and compression by the first compression device.

6. The web processing device described in claim 5, wherein:
the first compression device compresses the web with less pressure than the second compression device.

7. A fibrous feedstock recycling device comprising:
a defibrator configured to defibrate feedstock containing fiber;
a distributor configured to distribute defibrated material defibrated by the defibrator;
an accumulator configured to accumulate the defibrated material distributed by the distributor, and form a web;
a conveyor configured to convey the web in a first direction;
a first compression device configured to compress the web conveyed in the first direction;
a measurement device configured to measure a thickness distribution of the web in a second direction intersecting the first direction while the web is being compressed by the first compression device, or after the web is compressed by the first compression device;
a controller configured to compare measurements from the measurement device with a previously set thickness distribution, and control the thickness distribution of the web; and
a second compression device configured to compress the web after measurement by the measurement device and compression by the first compression device.

8. A web forming method, comprising:
distributing material containing fiber;
accumulating the dispersed material and forming a web;
conveying the web in a first direction;
measuring a thickness distribution of the web in a second direction intersecting the first direction while the web is being compressed, or after the web is compressed; and
comparing measurement results with a set thickness distribution, and control the thickness distribution of the web.

* * * * *